United States Patent
Baker et al.

(10) Patent No.: US 7,318,019 B1
(45) Date of Patent: Jan. 8, 2008

(54) WORD OUTPUT DEVICE AND MATRIX KEYBOARD FOR USE THEREIN

(75) Inventors: Bruce R. Baker, Pittsburgh, PA (US); Robert T. Stump, Duquesne, PA (US); Darlette S. Navrotski, Pittsburgh, PA (US); Russell T. Cross, Wooster, OH (US); Robert V. Conti, Bethel Park, PA (US)

(73) Assignee: Semantic Compaction Systems, Pittsburgh ( * ) Notice: Subject to any disclaimer, the term of this patent is extended or adjusted under 35 U.S.C. 154(b) by 1175 days.

(21) Appl. No.: 09/714,442

(22) Filed: Nov. 17, 2000

(51) Int. Cl.
*G06F 17/27* (2006.01)

(52) U.S. Cl. .............................. 704/1; 704/9

(58) Field of Classification Search .................. 704/3, 704/9, 1; 715/536, 773; 508/142; 708/146; 345/172
See application file for complete search history.

(56) References Cited

U.S. PATENT DOCUMENTS

| | | | | |
|---|---|---|---|---|
| 3,892,958 A * | 7/1975 | Tung | ........................... | 708/145 |
| 4,241,521 A * | 12/1980 | Dufresne | ..................... | 434/112 |
| 4,555,193 A * | 11/1985 | Stone | .......................... | 400/486 |
| 4,630,235 A * | 12/1986 | Hashimoto et al. | ............. | 704/4 |
| 4,661,916 A * | 4/1987 | Baker et al. | ................. | 704/260 |
| 4,725,694 A * | 2/1988 | Auer et al. | ................... | 345/173 |
| 5,115,390 A * | 5/1992 | Fukuda et al. | ................. | 700/17 |
| 5,128,672 A * | 7/1992 | Kaehler | ......................... | 341/23 |
| 5,164,723 A * | 11/1992 | Nebenzahl | ..................... | 341/23 |
| 5,210,689 A * | 5/1993 | Baker et al. | ..................... | 704/1 |
| 5,218,538 A * | 6/1993 | Zhang | ........................... | 715/534 |
| 5,299,125 A * | 3/1994 | Baker et al. | ..................... | 704/9 |
| 5,748,177 A * | 5/1998 | Baker et al. | ................. | 345/172 |
| 5,790,103 A * | 8/1998 | Willner | ........................ | 345/168 |
| 5,905,493 A * | 5/1999 | Belzer et al. | ................. | 715/835 |
| 5,953,541 A * | 9/1999 | King et al. | ..................... | 710/67 |
| 5,960,384 A * | 9/1999 | Brash | ............................ | 704/9 |
| 6,084,576 A * | 7/2000 | Leu et al. | ..................... | 345/168 |
| 6,359,572 B1 * | 3/2002 | Vale | ............................ | 341/23 |
| 6,850,225 B1 * | 2/2005 | Whitcroft | ..................... | 345/168 |

OTHER PUBLICATIONS

"Grotto Board", Ghora Khan Grotto, Inc., 1988.

* cited by examiner

*Primary Examiner*—Patrick N. Edouard
*Assistant Examiner*—Lamont Spooner
(74) *Attorney, Agent, or Firm*—Harness, Dickey & Pierce, P.L.C.

(57) ABSTRACT

A keyboard utilizing a matrix arrangement of word, character, numerical (print medium) keys to enhance a standard print medium keyboard. Instead of utilizing keys with letters and numbers, and instead of utilizing iconic symbols (or for use in combination with iconic symbols), the keyboard includes a plurality of keys arranged in at least two matrices. The keys of the first matrix are associated with each other in some manner, as are keys in at least one additional matrix. The matrices can include keys grouped together and grammatically associated with one another, by part of speech for example; and/or can include keys associated with a common color and a common number of selections necessary to access an associated word or word phrase. By use of such a keyboard, preferably in conjunction with a word output device, both manual and scanning input can be enhanced in a print medium environment, without the need to invest substantial time in memorizing complex iconic structures.

130 Claims, 10 Drawing Sheets

| | | | | | | | | | | | | | |
|---|---|---|---|---|---|---|---|---|---|---|---|---|---|
| | | | | | | | | | cl | gl | str | |
| | | | | | | | | ch | es | st | | |
| | | | | | | | br | en | sl | | | |
| | | | | | | | bl | dr | sh | | | |
| | | | | | | Plate | cr | ph shy | | | | |
| | | | | O | L like | gr give | tr | | | | | |
| | | | | I | . | K know | M make | | | | | |
| | | | | U are | J | N no(t) need | SPACE | | | | | |
| | 4 have | 9 last | | Y | H | B believe | DEL CHAR / DEL LAST | | | | | |
| | 3 minute | 8 year | | T think | G go | V | SHIFT | | | | | |
| | 2 second | 7 month | | R | F | C come | | | | | | |
| | 1 first | 6 week | | E every | D | X | | | | | | |
| | 0 next | 5 day | | W want | S some | Z | | | | | | |
| | | | | Q | A any | ' get | | | | | | |

WORD OUTPUT DEVICE AND MATRIX KEYBOARD FOR USE THEREIN

FIELD OF THE INVENTION

The present invention is directed to the field of keyboard technology and their use in conjunction with word and language output devices.

BACKGROUND OF THE INVENTION

In augmentative communication, iconic systems have employed general keyboard configuration structures to promote learnability and selectability for both direct selection keyboards and keyboards activated using some type of scanning system (including those used by people who were physically unable to actuate a key directly, but did so through some type of switch mechanism) to reduce the number of keystrokes required to generate natural language words in both highly and lightly inflected natural languages. In these iconic systems, such as that discussed in U.S. Pat. No. 4,661,916 to Baker et al., incorporated herein by reference in its entirety, icons were substituted for characters on a keyboard to permit access of words and word phrases using a reduced number of keystrokes. Such iconic systems also permitted important reductions in the number of keys scanned to reach a desired index, especially for people who did not want to invest the time and effort necessary to learn iconic structures.

The use of polysemous, multi-meaning icons enabled developers to construct iconic sequences to reduce the number of keystrokes, scanning steps, and memory requirements for representing natural language. Thousands of words were able to be represented by sequences of polysemous icons. The efficiency of having thousands of words represented by short icon sequences was used in tens of thousands of augmentative communication devices worldwide. However, time had to be invested by the user and/or by a teacher to learn the many icon sequences necessary to access words.

Representing thousands of words through iconic sequences, however, was not the only way to use keyboards to represent language. Simpler keyboards, somewhat easier to use and master, were developed which included keys with single meaning icons and/or which included character keys. Single meaning icons and character keys permitted access to a single word, phrase or sentence via simple keystrokes and thus were easy to use. However, keyboards lacked the word range and the efficiency and flexibility of iconic sequences. Thus, a need exists to combine the ease of use of single meaning icon and character keys with the efficiency and flexibility of iconic sequences. Further, a need exists to combine the reduced scanning burden achieved by use of icon sequences in a predictive manner such as that discussed in U.S. Pat. No. 5,297,041 to Kushler et al., incorporated herein by reference in its entirety, with the ease of use of single meaning icon and character keys.

SUMMARY OF THE INVENTION

The present invention, in one embodiment, is directed to a keyboard which utilizes a matrix arrangement of word or character keys, (print medium keys). The keyboard of a preferred embodiment of the present application includes a plurality of keys arranged in at least two matrices. The keys of the first matrix are associated with each other in some manner, as are keys in at least one additional matrix. The matrices can include keys grouped together and similarly grammatically associated, based upon part of speech for example; and/or keys associated with a common color and a common number of selections necessary to access an associated word or character (letter, number or bigram for example). By use of such a keyboard, preferably in a word output device, both manual and scanning input keyboards can be enhanced in a print medium environment, to enhance word output and decrease learning time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The various aspects and advantages of the present invention will become more apparent in connection with a detailed description and drawings as discussed below, wherein like reference numerals through the drawings represent like elements; wherein the preferred embodiments of the present application should not be considered limitative of the present application; and wherein:

FIG. 1 represents an example of a keyboard configuration of a preferred embodiment of the present application;

FIG. 4 is an example of another matrix of keys of the keyboard of FIG. 1;

FIG. 8 is an example of the keyboard of FIG. 1 and exemplary matrices encompassed therein.

DETAILED DESCRIPTION OF PREFERRED EMBODIMENTS

Figure 2:
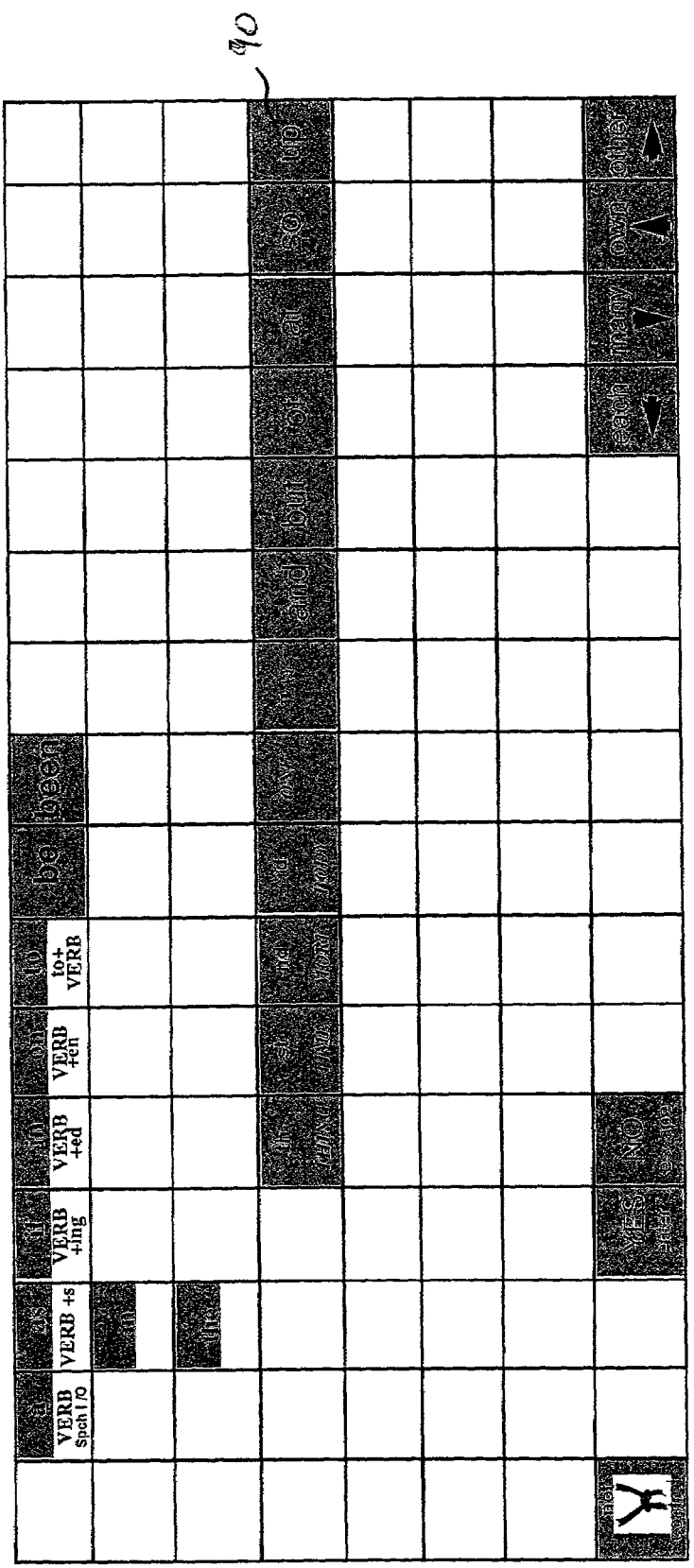
FIG. 2 is an example of one matrix of keys of the keyboard of FIG. 1.

The present application, in one preferred embodiment, is directed to a keyboard including a plurality of keys arranged in two or more matrices. Keys of a first matrix are linked or associated together in some manner, as are keys in the at least one other matrix. For example, keys of a matrix can be grouped together and similarly grammatically associated with one another, as can keys of at least one other matrix. The phrase "similarly grammatically associated" refers to keys of a similar part of speech and/or grammatical category such as pronouns, lexical verbs, modal/auxiliary verbs, etc. Further, keys "grouped" together preferably includes keys physically located proximate to one another (physically grouped or located together); but can also refer to keys "conceptually", cognitively and/or morphologically grouped together (related based upon a common concept, common cognitive relationship and/or common morphology and located either separate from each other or in close proximity).

Alternatively, or in addition thereto, keys of a matrix can be associated with a common color and a number of selections necessary to access an associated word or character, as can keys of at least one other matrix. For example, keys of a first matrix can be of one color and can require a single selection to access an associated word or character (letter, number or bigram) and keys of another matrix can be associated with another color and can require two selections or a sequence of two keys to access an associated word or character. Preferably, the keyboard is of a configuration wherein a majority of the keys are associated with a word. Even more preferably, words associated with keys of a common matrix are of a common part of speech.

By utilizing such matrices, and preferably links between matrices including grammatical links and/or links tied to key sequences necessary to access a word or word phrase, words and word phrases can be easily accessed in a manner familiar to the user, without requiring the user to learn new iconic sequences. Such grammatical links can include natural grammatical associations between different parts of speech, such as the relationship between pronouns and lexical verbs, pronouns and modal/auxiliary verbs, etc. In addition, by combining the use of these matrices with a type of prediction, utilizing visual indicators and/or the differentiating of keys of a grammatically linked matrix when a key of another matrix is selected for example, word phrases involving key sequences can be easily and efficiently accessed. Further, such a predictive aspect can also be used in conjunction with scanning devices such as row-column scanning or quadrant row-column scanning, to enhance scanning speed and again aid the user in accessing stored words and word phrases in an expedited and grammatically correct manner.

Print-based matrix prediction allows a variety of keystrokes savings and/or scanned step savings. An advantage to the non-iconic environment is a dramatic savings and learning time. Such keystrokes and scan step savings are significant for individuals who have a medical condition that impairs no performance, either in an acute or chronic capacity. In some situations, there will be an isomorphic correspondence between the physical form of a matrix and its underlying cognitive structure, but there may well be other associations where no such isomorphism exists. The cognitive underpinning (conceptual/cognitive and/or morphological grouping) is important. The physical organization or grouping (the proximate location of keys in a matrix) serves to teach and facilitate the use of cognitive matrices. For example, a cognitive matrix exists between prepositions (from) and demonstratives (this, that, these, those) so that when one is actuated "from", it could be a great efficiency of some high frequency co-occurrences such as those between "from" and "before" demonstratives exists.

In one preferred embodiment of the present application, core words or core language words are associated with keys on the keyboard. Core words are short words which are frequently repeated and which form the majority of the words in typical sentences. Core language indicates the repeated use of a small number of different words (for example, under 500) to express a wide range of ideas in natural (human) language. Typically, across a broad range of human languages, a small number of words are used over and over again for expression of human thoughts. Researchers have found that the 100 most frequently employed words of a typical adult accounts for 60 percent of the total words that he or she uses. The most frequently occurring 250 words often represent more than 85 percent of the total words used. Thus, through the use of keys associated with such core language words, the majority of spoken words can be easily and efficiently accessed.

As an example, in the following sentence composed of 10 words, 8 words are "core" words and 2 words are "fringe" words: "I went to the museum yesterday and saw a dinosaur." In the foregoing sentence, the words "museum" and "dinosaur" represent fringe words. The remaining 8 words are core words.

The total number of words an individual uses is typically very high. For English language speakers, 10,000 to 15,000 total different words is normal. However, a number under 500 of these words are used more frequently than 5 times per thousand. The words a typical speaker users more than 5 times per thousand are called these core words or core language words. Generally speaking, core words constitute 60-80 percent of the total words in a speech sample.

Accordingly, by utilizing a keyboard preferably including keys associated with these core words, and by segmenting the keyboard into various matrices, an efficient keyboard is achieved which allows a user to easily access most of the words necessary for speech.

The matrix structure of the keyboard of the present application preferably includes not only keys within a matrix being grammatically associated, but also grammatical association or linking between matrices. In essence, the keyboard is preferably arranged to focus on co-occurrences of words, such as core words, and to arrange matrices of keys to reflect a structure producing co-occurrences of words and word phrases. The term co-occurrence, in this content refers to words naturally occurring together because of their deep grammatical structure (e.g. "Will I"; "He is"; "to walk"; "from the"; "whatever"); and thus form a basis for grammatical links or associations between matrices. By utilizing indicators on keys of a keyboard or some type of differentiation or highlighting of keys on a virtual keyboard, and by utilizing matrices producing such co-occurrences, when a key in a first matrix is selected, indicators associated with keys of at least one additional matrix (preferably a related or grammatically linked matrix) will be activated (or such keys of the at least one additional matrix will be highlighted or otherwise differentiated from other keys) to enable a user to link co-occurring words.

Such a keyboard enables a user to complete simple thoughts utilizing co-occurring words presented in different matrices. This can be extremely helpful to a user utilizing a normal keyboard where keys can be activated using a finger, headstick, or other type of direct key activation input devices as will be described hereafter with regard to FIG. 7; and is even more advantageous to a user utilizing a row-column/quadrant row-column scanning, or another type of scanning type of input device (as will be described hereafter regarding FIG. 6) where keys of a keyboard are typically scanned through for selection by the user. While aiding a user in manual selection (prediction) of a next related key is helpful (which can be achieved utilizing the embodiment of FIG. 7 of the present application for example), eliminating keys which are not potential next key selections is extremely valuable in a row-column/quadrant row-column or other types of scanning type input devices since only possible next key selections need be scanned (thereby increasing scanning speed and reducing the potential for scanning error). Such an arrangement is extremely valuable for people who are physically unable to select a key directly, and who must use some type of switch or other input unit as will be described hereafter with regard to FIG. 7, or who must utilize some type of scanning input device as will be described hereafter with regard to FIG. 6.

Figure 1:
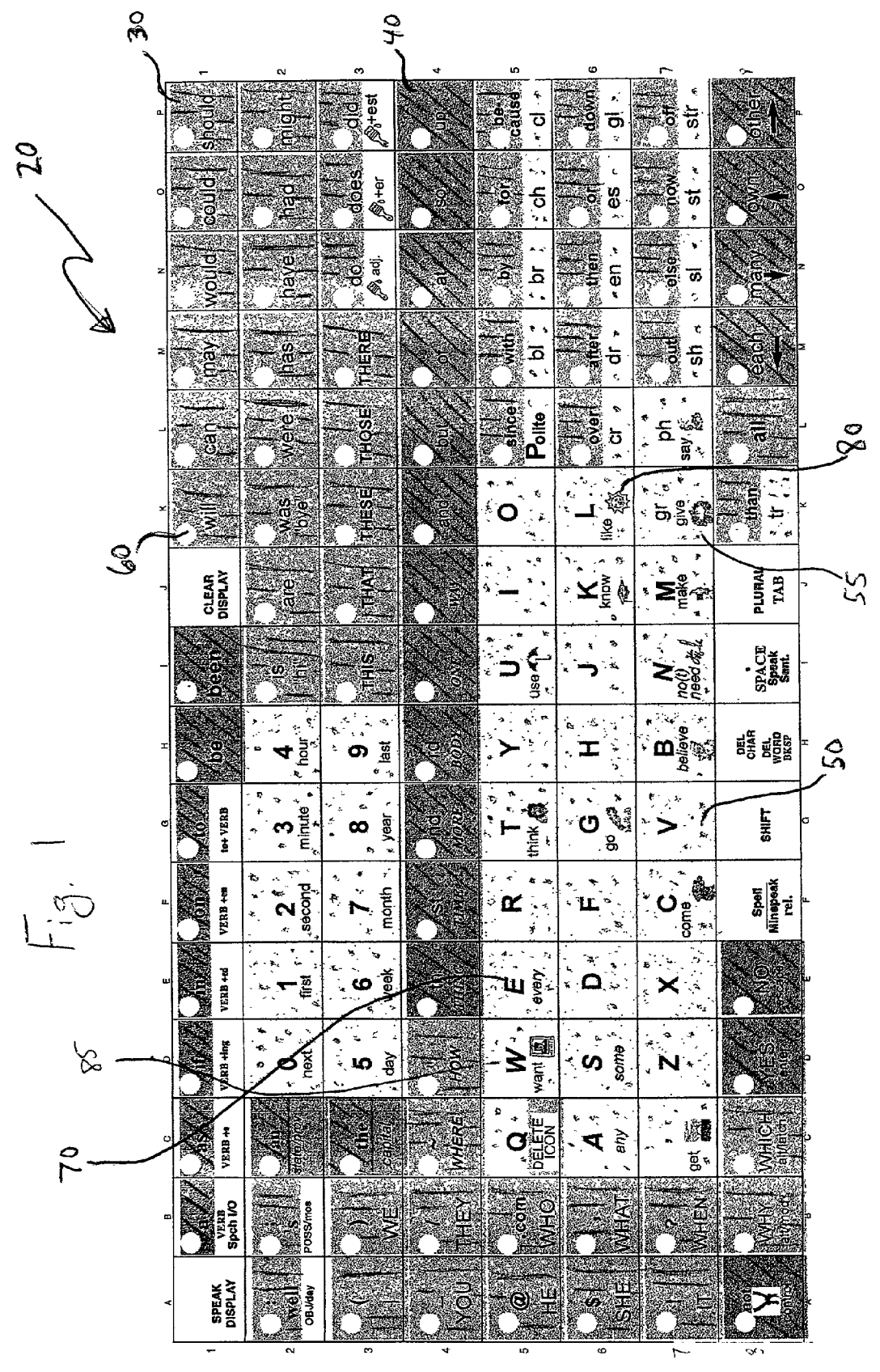

One example of a keyboard of the present application is shown in FIG. 1. The keyboard 20 preferably includes 8 rows of keys, arranged in 16 columns, wherein the number of rows and columns of keys is merely exemplary and should not be considered limitative of the present application. As a first example of matrix arrangement of keyboard 20 of the present application, the keyboard preferably includes keys of three different colors, with some additional uncolored keys. A first "matrix" of keys includes keys of a first color, for example "green", represented by keys including vertical lines such as key 30 including the word "should". This first matrix of keys are not only of a common color, but also preferably require a common number of "hits" or selections, before outputting the word. In the example keyboard 20 of FIG. 1, the "green" keys (such as key 30) require two selections before outputting the associated word or an associated word phrase. Thus, the word on the key will be output if the same key is selected two times. Alternatively, if two keys are selected one time which form a stored key sequence corresponding to a word phrase, the sequence of words will be output.

A second exemplary matrix of keys shown in the example keyboard 20 of FIG. 1 includes keys of another color, for example, "pink", as designated by the diagonal lines such as that shown with regard to key 40 including the word "up". These keys are preferably of a second common color, and also preferably require the same number of hits or selections before outputting a word associated therewith. For example, these "pink" keys preferably output an associated word with a single hit or selection. Thus, by selecting the key 40 one time, the word "up" is output.

A third exemplary matrix of keys shown on the keyboard 20 of FIG. 1 can include keys of a third common color, for example, "yellow", represented by dotted keys such as key 50 corresponding to the letter "V". These yellow keys are preferably used to indicate characters such as letters, numbers and bigrams (letter groupings such as the grouping "gr" associated with key 55, for example), and are preferably used (at least the "letter" keys) in a type of spelling mode to spell words not included on the keyboard, such as "fringe" words. In a spelling mode, known word prediction techniques can be used to increase spelling efficiency and quick access to such "fringe" words. This can include various word prediction techniques including those mentioned in U.S. Pat. No. 5,210,689, the contents of which are incorporated herein by reference. When utilizing such word prediction techniques, the keyboard 20 of FIG. 1 is combined with a display unit, such as output unit 270 of FIG. 5 for example, so as to display various predicted words for selection (predictive selection).

In one preferred embodiment, this third matrix of keys also includes an additional submatrix of keys including some commonly used lexical verbs. Such lexical verbs including the word "like" associated with the letter "L" on key 80; the word "want" associated with the letter "w" on key 85; the word "every" is associated with the letter "E" on key 70; etc., preferably form a matrix separate from another matrix of auxiliary or modal/auxiliary verbs such as "is", "are", "was", for example (a separate matrix of "green" keys in the keyboard of FIG. 1 for example). By separating lexical verbs from auxiliary or modal/auxiliary verbs, matrices can be linked together in different grammatical ways following different grammatical rules.

For example, most auxiliary or modal auxiliary verbs can be easily inverted to form a question and can thus be linked to a matrix of pronouns as such. For example, the phrase "I was" is easily inverted to form the phrase "Was I" to thus be presented in a question format. Accordingly, a first matrix can be formed including pronouns such as "I", "we", etc. (grammatically associated as pronouns and grouped together on the keyboard) can be grammatically linked to another matrix including auxiliary or modal/auxiliary verbs such as "is", "are", etc. As such, when the key associated with "I" is selected, followed by the key associate with "was", the phrase "I was" is easily generated based upon a stored key sequence. Similarly, when the key associated with "was" is selected, followed by the "I" key, the phrase "Was I" is similarly generated. It should be noted that such grammatically associated matrices, grammatically linked to other matrices, need not be included on a keyboard which is color segmented as shown in FIG. 1. The concept of grammatically associated matrix groups can be independent of the idea of common color matrices and need not be sub-matrices thereof.

Similarly, by separating out lexical verbs as a separate matrix, these verbs can be separated grammatically with the pronouns, to form phrases following a different set of rules than those of the auxiliary or modal/auxiliary verbs. Since these words cannot be easily inverted to form a question, "do" support can be interpolated to form the question form when associated or grammatically linked to another matrix such as the pronoun matrix for example. For example, if the pronoun "I" is first selected, and the verb "like" is next selected, the phrase "I like" is easily generated. However, if the key "like" is first selected, and the pronoun "I" is next selected, since the lexical verbs have been separated from the auxiliary or modal verbs and therefore can follow a preprogrammed set of different rules, the phrase "Do I like" (with the "do" word being interpolated) can be generated instead of the phrase "like I". This can be done based upon rules being followed or based upon a key sequence stored in association with the word phrase. Thus, while the lexical verb matrix and the auxiliary or modal/auxiliary verb matrix are both grammatically linked to the pronoun matrix in this preferred embodiment, the use of the separate matrices allows them to be grammatically linked in different manners. Again, such grammatically associated matrices and multiple grammatically linked matrices are concepts which can be considered independent of the idea of common color matrices and need not be sub-matrices thereof.

As shown in the keyboard 20 of FIG. 1, some of the keys may optionally include icons or symbols in addition to a letter or word associated therewith. One example is the use of the sun symbol or icon on the key 80, in combination with the word "like" and the letter "L". Such use of icons can be used to increase the number of words associated with a single key. The icons or symbols are preferably polysomous (multi-meaning), and can be used in a manner such as that disclosed in U.S. Pat. No. 4,661,916 to Baker et al. issued Apr. 28, 1987. For example, key 85 includes the "W", the word "want", and the icon illustrating a man on a wanted poster. As such, the verb "want" can be generated by pressing the key, and can be combined with words of other matrices to output word phrases. To generate the word "want", first the "W" key is selected, and then the "verb" key is selected. However, since the wanted poster can also have many meanings, a "w" key can also be used to generate the word "mean", since a criminal can be "mean". This can be done by selecting the "w" key twice in succession, and then selecting the verb key. Such icons can be used to expand the number of words directly accessible by keys of the keyboard 20, as well as word phrases linked to words of other matrices.

Although keys of a matrix are preferably physically grouped together and proximately located on the keyboard, they need not be so physically grouped together. Instead, they may be only "conceptually", "cognitively", and/or "morphologically" grouped based only on related concepts and not related location. One example is the "article" matrix, which can be grammatically linked to the "preposition" matrix to form the common phrases "with a", "over the", "by the", etc. Although the preposition matrix keys are located together, the keys of the "article" matrix need not be located together and may be located at different locations throughout the keyboard; and thus only "conceptually", "cognitively" and/or "morphologically" grouped together, based upon the "fact" that they are all articles, for example.

Further, matrices preferably include a plurality of keys, but can include even a single key. For example, the "E/every" key can be the only key in the "ever" matrix, which can be grammatically linked or associated with the "question word" matrix including the "who", "what", "how", "when", etc. keys to form the stored words of "whoever", "whatever", "however", "whenever" etc.

Finally, the keys of keyboard 20 of FIG. 1 preferably include an optional indicator 60, which can be a light indicator, such as an LED, for example. These indicators are preferably associated with each one of the plurality of keys, wherein selection of the key in one matrix preferably enables activation of indicators associated with the keys of at least one additional related matrix (such as those in a grammatically related matrix, for example). As such, a user can be lead to keys of a matrix related to a matrix of a previously selected key so as to thereby take advantage of the matrix structure and arrangement of the keyboard 20 of FIG. 1 of the present application to produce co-occurrences of core words to thereby limit the number of keys to be visually scanned through (predictive selection utilizing an indicator 60 for example) and/or to limit the number of keys to be automatically scanned through when utilizing a row-column/quadrant row-column scan, or other type of scanning input device such as that as will be described hereafter with regard to FIG. 6, for example (an automated version of predictive selection). Alternatively, the keyboard 20 may be displayed as a virtual keyboard, as will be discussed with regard to the integrated input and display of FIG. 9 for example. Thus, other ways of differentiating keys of a related matrix from other keys can be used, such as highlighting for example. Again, this type of predictive selection can aid both manual visual scanning as well as row-column or quadrant row-column scanning systems, for example.

It should be noted that while the matrix configuration of the keyboard 20 of the present application can be used by individuals who have difficulty selecting a key, such as individuals with severe handicaps including cerebral palsy, ALS, etc., the matrix configuration can also be used by individuals who have no physical problems accessing such technology. The underlying linguistic structures of the matrix configuration will facilitate the generation of language output for anyone using the invention. Thus, although the keyboard 20 is preferably aimed at insuring efficient access for individuals with severe disability, this does not exclude its use by individuals who have no significant motor problems.

In an effort to better illustrate one example of color matrix segmentation of the keys of the keyboard 20 of FIG. 1, FIGS. 2-4 have been supplied. FIG. 2 illustrates a first exemplary matrix of keys 90, corresponding to the "pink" keys of FIG. 1. These keys are preferably single hit keys which will produce a word upon being selected one time.

Figure 3:
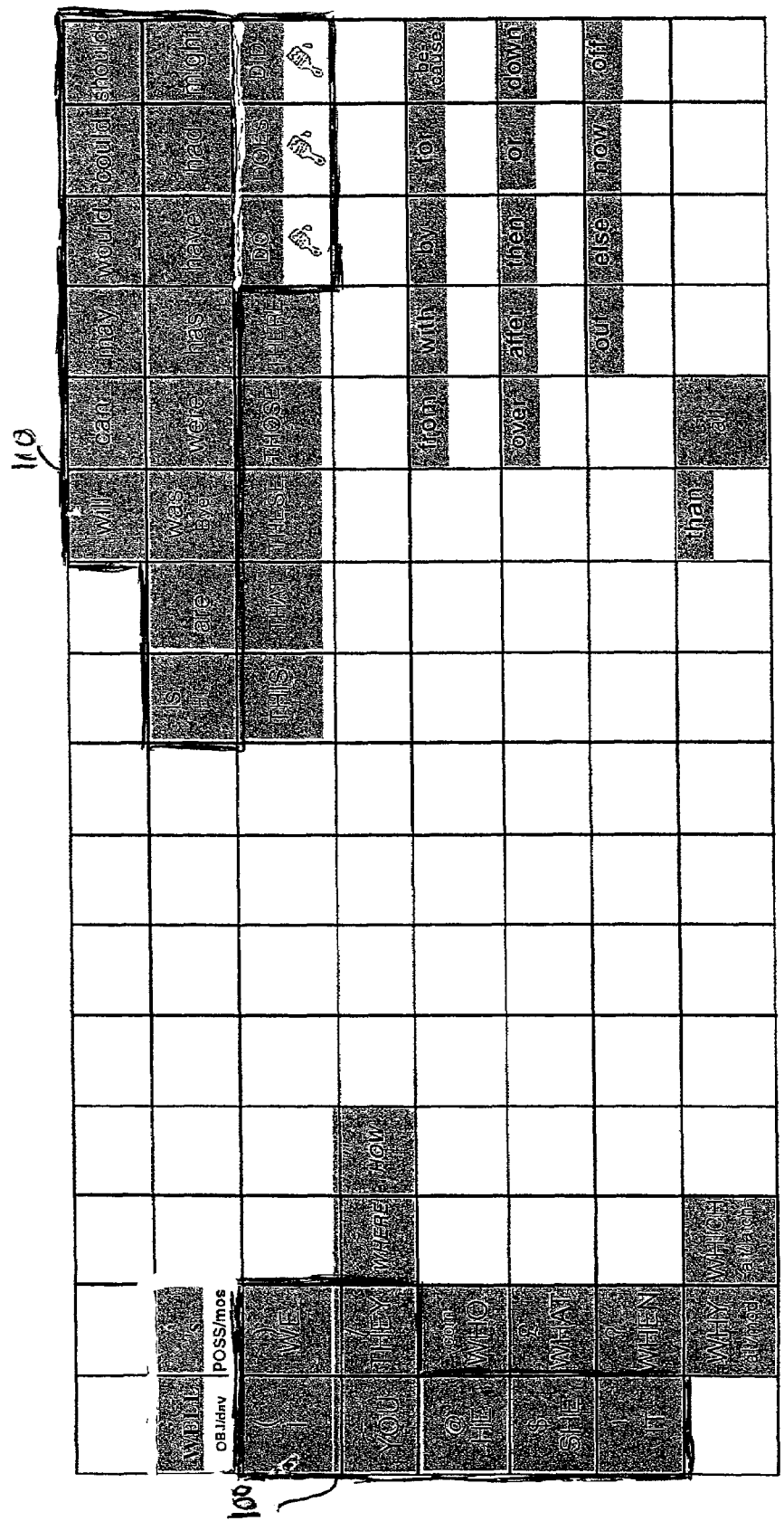
FIG. 3 is an example of another matrix of keys of the keyboard of FIG. 1.

As shown in FIG. 3, the exemplary matrix of "green" or two hit keys are illustrated. These keys are preferably segmented in various sub-matrices including a pronoun matrix 100 and a matrix of auxiliary or modal verbs 110. It should be noted that although the matrices 100 and 110 have been described as sub-matrices, they are in essence separate matrices which are grammatically associated with one another, grouped together, and grammatically linked to keys of at least one other matrix. Such grammatically linked matrices can include keys of a common color, but need not be of a common color. For example, referring back to FIG. 1, a matrix of keys including the yellow keys "any", "some", "every" and "no" are part of a matrix, and they are preferably related to another matrix including both green and pink keys to form indefinite pronouns when combined with the yellow keys. Namely the keys "where", "how" (two green double hit keys), "thing", "time", "more", "body", "one" and "way" (pink single hit keys) are all part of a common grammatically associated matrix of keys which are grouped together. This matrix of keys is grammatically linked to the aforementioned yellow keys to form various indefinite pronouns such as anywhere, someone, no way, everybody, etc. Thus, matrices can include keys of different colors and need not include any type of keys colored in any manner; and can merely be grouped together and grammatically associated.

Finally, FIG. 4 illustrates keys of the keyboard 20 of FIG. 1 which are an exemplary matrix of "yellow" keys. These can include the numerical keys of a first sub-matrix 120 as well as the letter keys of a second sub-matrix 140. In this preferred embodiment, the yellow keys also include separate sub-matrices including the words associated with various ones of the number keys in the group 120, as well as the lexical verbs associated with various ones of the letter keys in group 140. Again, color should not be considered limiting or essential as a matrix can also include keys of no color or different colors which are grouped together and grammatically associated.

The keyboard 20 of the present application is preferably one including print medium keys, wherein a majority of the keys are associated with a word, and even more preferably with a core language word. The keys are preferably grouped in at least two matrices, wherein words associated with keys of a matrix are grammatically associated (and even more preferably of a common part of speech), with words of keys of different grammatically linked matrices being preferably stored in a memory 260 (such as that of FIGS. 5-7 as will be explained in more detail hereafter) and accessed upon keys of an associated key sequence being selected.

Some examples of various matrices included in the keyboard 20 of FIG. 1 include the three colored matrices previously described, namely the pink single hits, the green double hits, and the yellow bigrams, letters and numbers. Grammatically linked matrices can include the personal pronoun and helping verb matrices 100 and 110 of FIG. 3; the power or lexical verb matrix including some of the yellow keys, linked to the pronoun matrix; the indefinite pronouns formed by the any, some, every, etc., key matrix grammatically linked with the key matrix of where, how, thing, time, etc.; as well as many other matrices. Many example matrices and other grammatically linked matrices of the example keyboard 20, as well as an alphabetic dictionary including individual words accessible by various key combinations of the keyboard of FIG. 1 are noted in Appendix 1, attached hereto.

Figure 5:
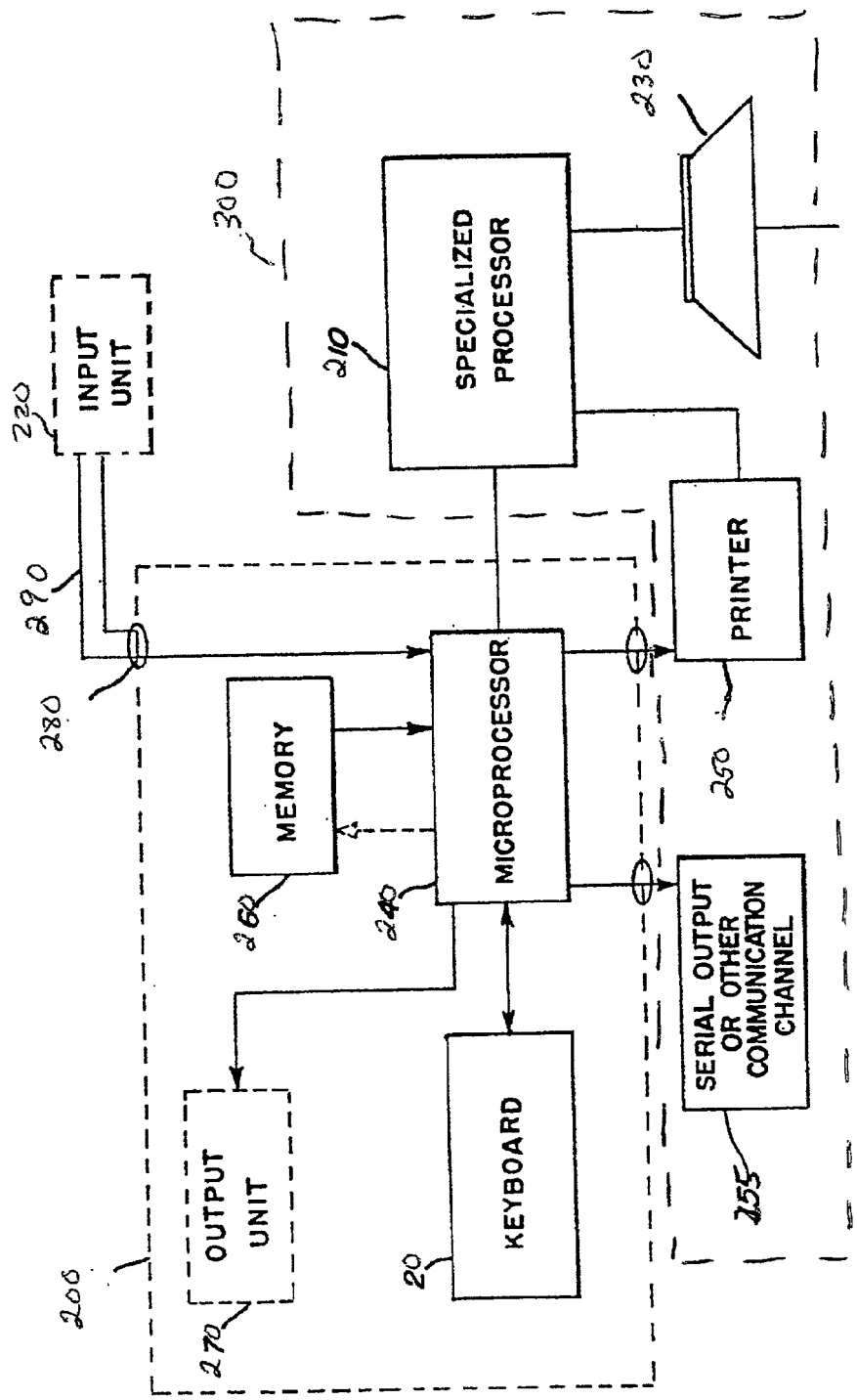
FIG. 5 is a schematic diagram of a word output device of the present application.
Figure 5A:
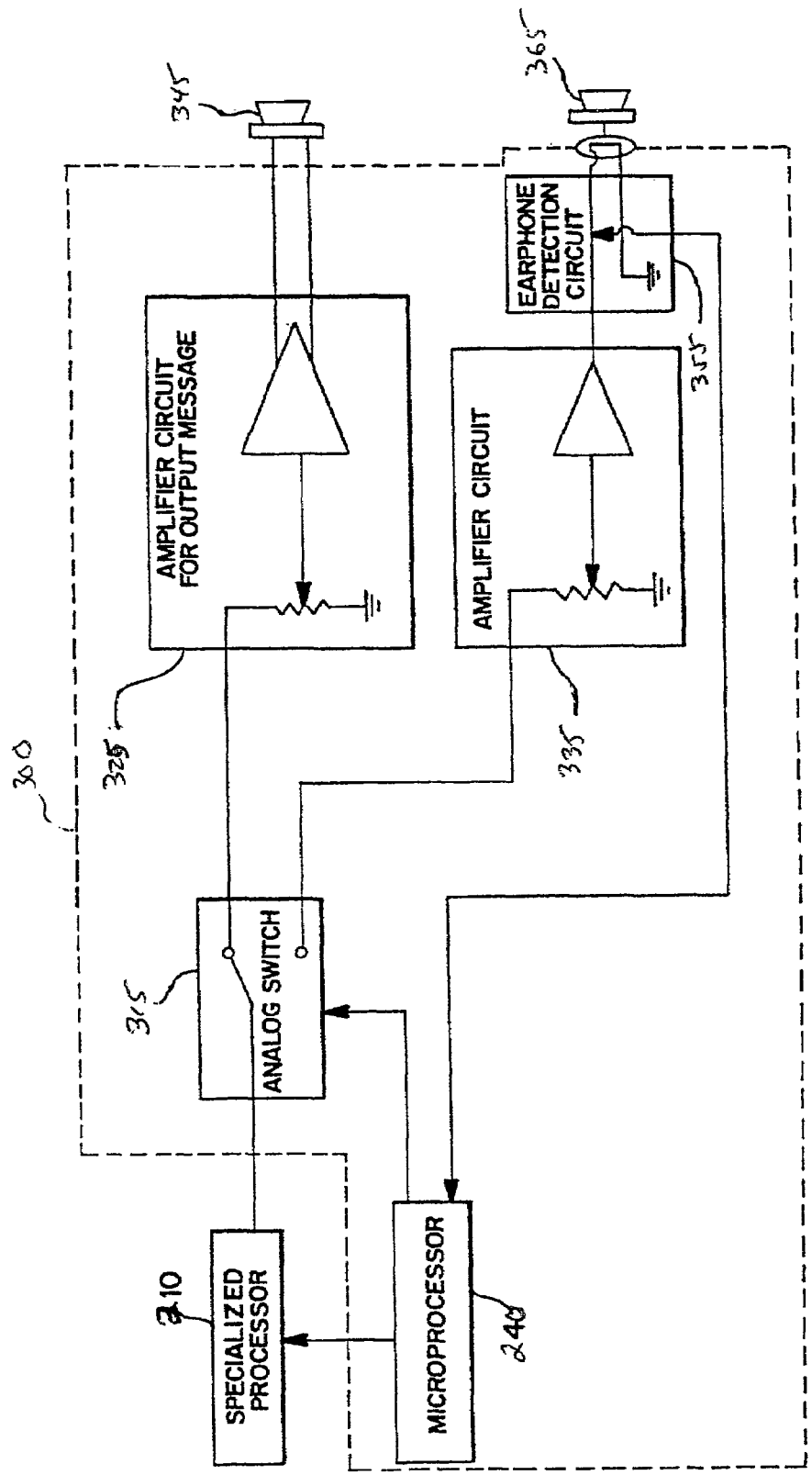
FIG. 5a is a schematic diagram of one example of components of an output device utilized in conjunction with word output device of the present application.

FIGS. 5 and 5*a* illustrate a schematic diagram of an exemplary word output device 200 utilizing a matrix keyboard, such as keyboard 20 and/or a virtual keyboard of the present invention. As shown in FIG. 5, the word output device 200 preferably includes a keyboard 20, such as the keyboard of FIG. 1 (which may be substituted with or augmented by a virtual keyboard), microprocessor 240 acting as a controller; and a memory 260. The keyboard 20 preferably includes a plurality of keys arranged in a first matrix, grouped together and similarly grammatically associated and/or colored, and a plurality of keys arranged in a second matrix, also grouped together and similarly grammatically associated and/or colored. The memory 260 preferably stores words, word phrases or characters in association with a key or key sequence. The controller 240 preferably accesses stored words, word phrases or characters in response to key selections. An output unit 300 is preferably for outputting the accessed word, word phrase or character. As shown with regard to FIGS. 6 and 7, the word output device 200 can further include an input device 220 as will be described in greater detail hereafter.

The memory 260 preferably stores key sequences and associated words or word phrases, e.g., "I"+"will" equaling the phrase "I will" in a look-up table format. Alternatively, or in addition thereto, words can also be accessible via various rules based upon certain keys selected or a combination thereof.

Memory 260 preferably includes some or all of the words and word phrases stored in association with key sequences as listed in the alphabetic dictionary of Appendix I. The "dictionary" illustrates how a key sequence, including one or more key selections, can be used to access a single word via a look-up table stored in memory 260. For example, a single selection of the pink (one hit) "and" key outputs the word "and"; two successive selections of the green (two hit) "are" key is needed to output the word "are"; etc.

Further, memory 260 preferably grammatically links some or all of the minspeak matrices listed and described in Appendix I to other matrices (e.g., linking the pronouns to the auxiliary/modal auxiliary verbs), which are accessible via controller 240 based upon key selections. For example, the phrase "I will" is stored in association with the key sequence of "I"+"will", requiring a sequence of first "I" key selection and a second "will" key selection. Most or all of the auxiliary/modal auxiliary verb matrix keys are stored as sequences with most or all of the pronoun matrix keys to permit access of various to phrases including "I will"; "You may"; "He can"; etc., in a similar manner requiring two different key selections. Further, as the auxiliary/modal auxiliary matrix can easily by reversed with respect to the pronoun matrix, each of the reverse "question" phrases such as "Will I"; "May you"; "Can he"; are also stored requiring a sequence of two key selections in the inverse order, e.g., "will"+"I"="Will I". A description of various possible matrices will not be given for the sake of brevity, with reference merely being made to Appendix I.

Memory 260 can include permanent read-only memory as well as random access memory. The memory 260 is adapted to store words, word phrases, characters, etc., each preferably stored in association with one or more of the plurality of keys, either in a look-up table format or using some type of rule based association.

A controller, such as microprocessor 240, is adapted to access a word or word phrase stored in memory in response to selection of one or more of a plurality of keys. Finally, an output unit 300, such as a speech synthesizer, is adapted to output the accessed word or word phrase.

The word output device 200 is shown in conjunction with an optional output unit 300 which can include any or all of the following: specialized processor 210, printer 250, serial output and/or communication channel 255, speaker 230, amplifier circuits 325 and 335 and associated speakers 345 and 365; microprocessor 240; earphone detection circuit 355; and/or analog switch 315. Circuit 325 and speaker 345 may be omitted, with all audio output routed through circuit 335 to speaker 365. The word output device 200 preferably acts as a speech synthesizer and generates input for the specialized processor 310 based on accessing information corresponding to selected keys or key sequences of keyboard 20 and outputs accessed previously stored corresponding information to a speaker 230. The device 200 preferably generates input for the processor 210 based on accessed information corresponding to keys or key sequences of the keyboard 20. Alternatively, the specialized processor 210 may be omitted, and the device 200 may output processed information directly to printer 250 or to a communication channel 255 (of course, information can also be routed to printer 250 and communication channel 255 indirectly through specialized processor 210). Any or all of the output units 300 of device 200 may be selected to output an accessed word, word phrase or character.

Further, the device 200 may include an output unit 270. This output unit 270 can be one of a processor and speaker to generate audible sound waves, a light source matrix with individually controlled lights, a display screen for displaying selected or accessed words/selected keys/predicted words (if word prediction is used)/soft or virtual keys/or any similar type output device or combination of devices which can be utilized in conjunction with one of a plurality of different input devices 220.

Alternatively, the keyboard 20 and a display device can be integrated together, wherein keyboard 20 is replaced and/or augmented by a virtual keyboard displayed on such an integrated input and display device. This will be described further with regard to FIG. 9.

The input device 220 may be one or more of a plurality of input devices (which will be described subsequently) which is utilized in conjunction with the output device 300 and the microprocessor 240 to activate signals corresponding to the plurality of selected keys on the keyboard 20 and thus indicate selection of a particular key. Further, this input device 220 can be connected to the microprocessor 240 through a cable 290 which is attached to an input port 280 of the system 200, or it can be connected in any other wired or wireless manner. Thus, a plurality of various input units 220 may be utilized to effect key selection and activation without depressing a key on the keyboard 20. Of course, the input device 220 is optional as keys can merely be selected by finger or other direct pressure activation.

The processor 210 may be a language translator, a voice synthesizer or any other similar-type processor which may process words and/or word phrases, accessed by the device 200 from memory 260. Upon processing of the accessed words or plural word phrase, the word or word phrase may then be output to an analog switch 315 under the control of microprocessor 240 as shown in FIG. 5*a*. This switch 315 can then send the audio output signal of processor 240 to amplifier circuit 325 and then to speaker 345 as shown in FIG. 5*a*, to output an audible message corresponding to the accessed stored word or word phrase to communicate the accessed word or word phrase to another person. The specialized processor 210 may be one of a commercially available speech synthesizer such as the Votrax speech SPAC with the SC-01 voice synthesizer chip therein, marketed by Votrax or the commercially available DecTalk or SmoothTalker, for example. The output of the synthesizer 210, or a similar specialized processor, may be in turn coupled to a speaker 345 as described above to generate audible synthetic speech in a manner well known in the art. Microprocessor 240 may also use the analog switch 325 to route the audio output signal from processor 210 to amplifier circuit 335 and then to a private listening speaker or earphone 365 used by the operator of device 200 to receive auditory feedback from the system (during auditory scanning, for example). If the earphone detection circuit 355 indicates that no external earphone or speaker is connected, or alternatively, if the entire audio circuit system of 335, 355, and 365 is omitted, this auditory feedback signal can be routed to amplifier 325 and speaker 345. Such a system for outputting audible information is generally represented by elements 210 and 230 in FIG. 5.

The addition of auditory scanning capabilities (to be described in more detail hereafter) to a system requires that the specialized processor 210 includes a microprocessor controlled speech synthesizer. The synthesizer should be a high quality synthesizer that is easily understood by the user. Anything less will make the system difficult to learn and use in other than optimal conditions. To maximize the effectiveness of the system, provisions need to be made in the hardware to allow the microprocessor 240 to route the audio signal output from the specialized processor 210 either to the user or the conversation partner. If both the system prompts and user generated speech are sent to the external speaker 345, the conversation partner will have system prompts intended for the user's access requirements. The exemplary implementation of auditory scanning is shown and described regarding FIG. 5*a* and uses an analog switch 315 to route the output from the speech synthesizer to either the standard audio output circuit 325 to speak to a listener through speaker 345, or to route the audio to the prompt audio output circuit 335 to inform the user of the present state of the system through an earphone or private speaker 365. An earphone detection circuit 355 is also included in this example. The system can detect if the earphone becomes disconnected and route the auditory scanning prompts to the main speaker if needed to keep the system functional.

Figure 6:
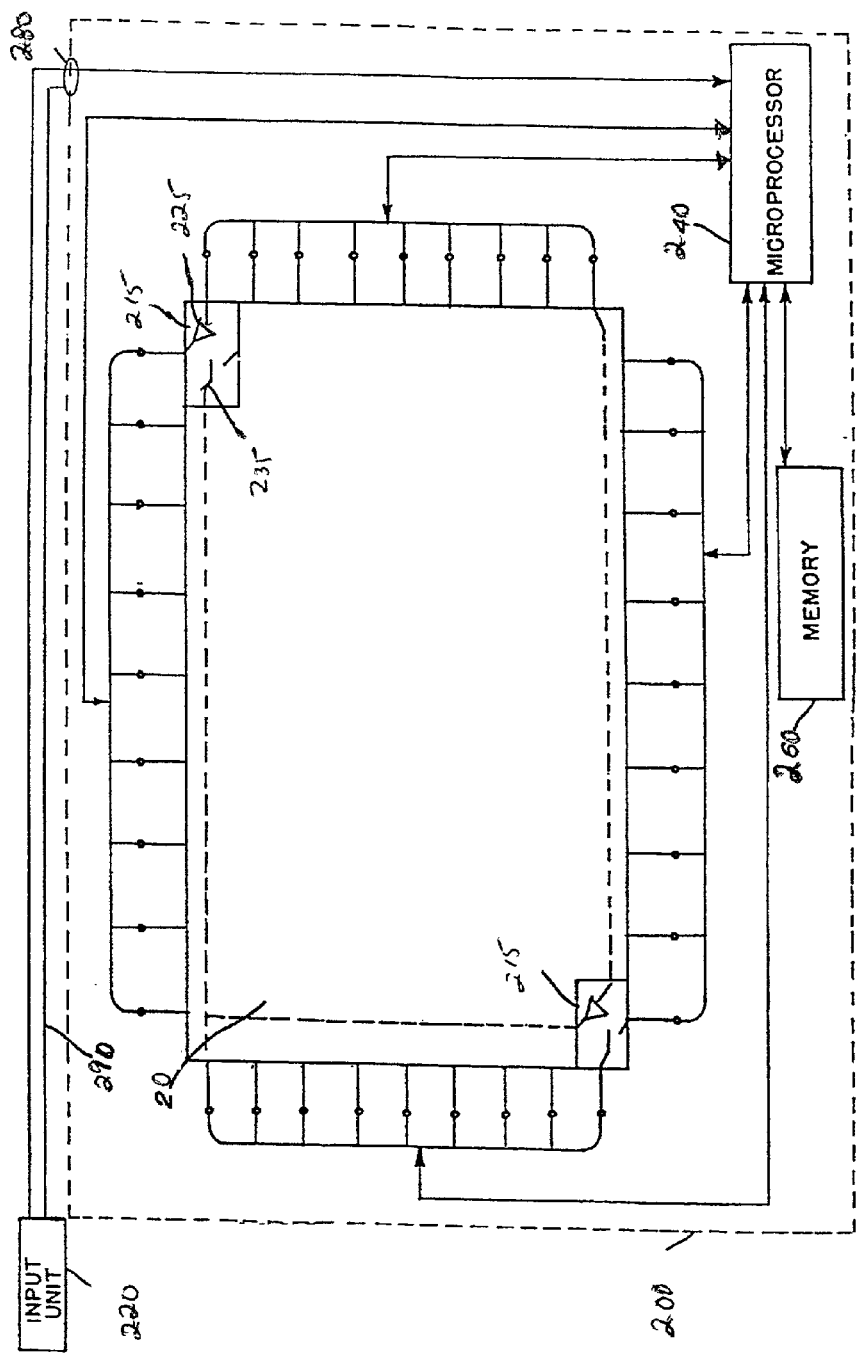
FIG. 6 is an example of an embodiment of the word output device of the present application.

FIG. 6 illustrates one preferred embodiment of the device 200 of the present invention used in conjunction with a scanning input unit 220, adapted to successively access keys (in a somewhat restricted manner as will be explained hereafter) of rows and columns of the keyboard for selection. In this preferred embodiment, the keyboard 20 is arranged such that keys 215 are formed in a plurality of rows and columns. Each of the plurality of keys 215 is associated with a word, letter, number or specific instruction or function, or a type of mode, or combination thereof; and some optionally including a polysemous symbol or icon. Examples of the various keys 215 on the keyboard 20 are shown in FIG. 1. It is the selected keys (or key sequences) which can be utilized to access each of the stored words or word phrases from memory 260. Further, the letters associated with various keys can also be utilized to produces words in a spelling mode. Two such examples of the keys 215 on the keyboard 20 are shown in FIG. 6.

Figure 7:
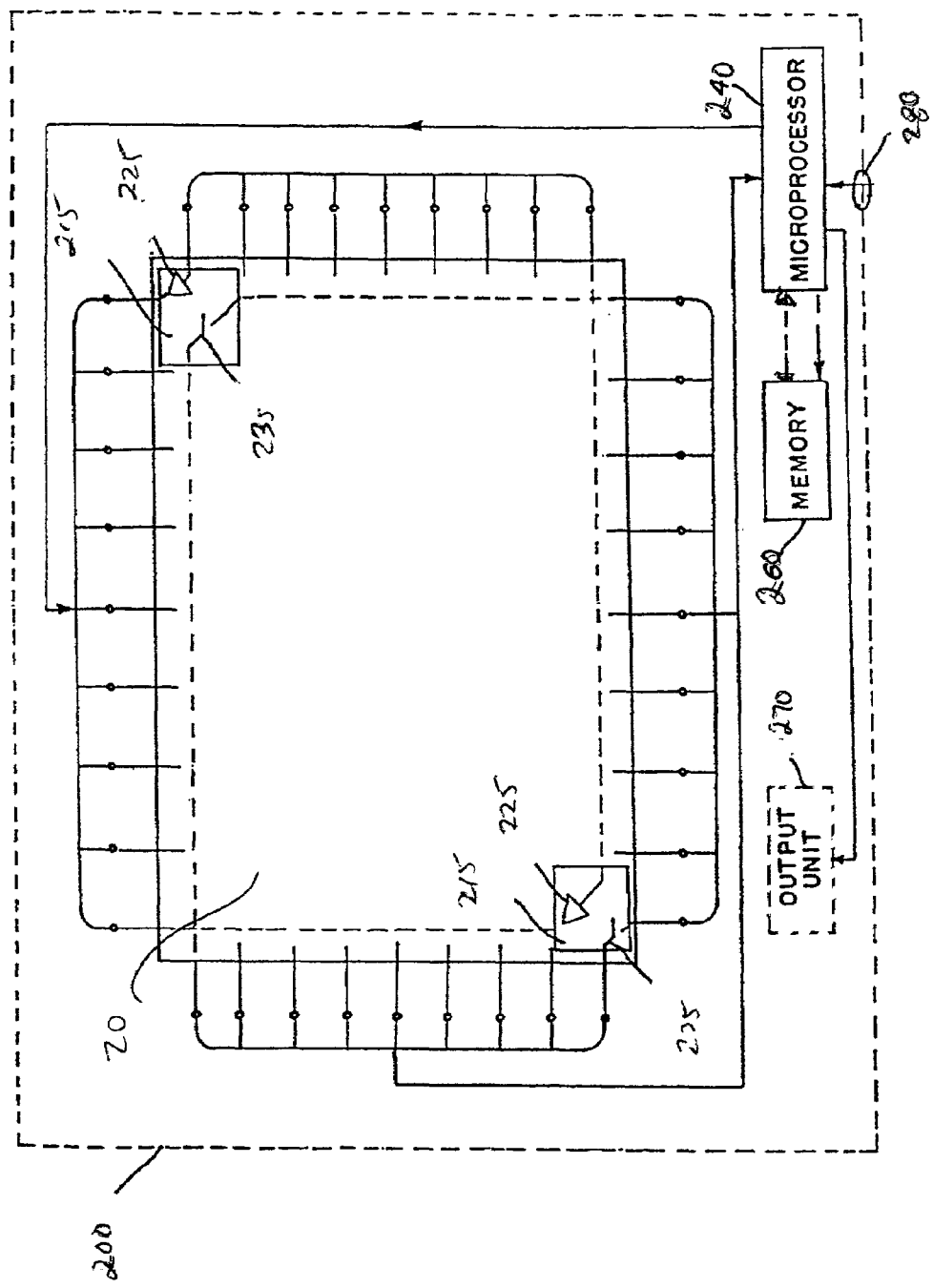
FIG. 7 is another example of another embodiment of a word output device of the present application.

As can be seen with regard to FIGS. 1, 6, and 7, each of the plurality of keys on the keyboard 20 further preferably contains an indicator, such as a visual indicator or light. These indicators are shown by a circle 60 in the upper left hand corner of each key, in FIG. 1. As shown in FIGS. 6 and 7, each of the lights may be, for example, light emitting diodes (LEDs) 225 which emit a colored light indicating to a user a key which can be activated (the type of lights in the figures is merely illustrative and the positioning is not limited to that shown in the figures). Alternatively, instead of lights, highlighting or other means of differentiating selectable keys from non-selectable keys can be used. Such differentiating can be used, for example, when using a virtual keyboard instead of, or in addition to keyboard 20.

These LEDs 225 (or other indicators or means of key differentiation) are preferably activated by a microprocessor 240 sending a predetermined voltage to particular rows and columns corresponding to particular keys 215. Further, with regard to a scanning input embodiment of the present invention as shown in FIG. 6, each of the plurality of rows and columns of LEDs 225 are sequentially activated (in a restricted manner), first by row and then by column.

In this first preferred embodiment, it is only the rows and columns of a limited number of keys 215 which are activated during the sequential row-column type scan, and not every row or column in succession. For example, only rows or columns including keys linked to a selected key (keys of a matrix grammatically linked to a matrix of a selected key, for example) or otherwise associated with a selected key, such as those keys corresponding to words which occur in one or more stored key sequences following the previously selected key (sequences of keys necessary to access a stored word or word phrase from memory 260, which can include sequences of different keys and/or a sequence of the same key listed twice, for example), are activated to thereby define a limited number of keys for predictive selection which can produce or lead to the production of a stored word or word phrase (or even two, three, etc. letter "character" sequence) involving the selected key. As such, other keys are preferably locked out and inaccessible.

For example, the memory 260 is adapted to store words and word phrases in association with a single key or key sequence; and/or in association with a key of one matrix and a key of a grammatically linked different matrix. Thus, assuming that the "will" key in the auxiliary/modal auxiliary matrix is first selected, controller 240 determines which are potential "next key" selections which would continue a sequence or result in access of a stored word or phrase in memory 260. As "will" is a green "two hit" key, the "will" key will be an active next-key, as will each of the keys of the pronoun matrix since they can be used to output the phrases "will I"; "will you"; etc. Thus, upon selection of a first "will" key, the controller 240 essentially restricts the row-column scanner to access of keys in at least one other grammatically linked matrix (the "pronoun" matrix for example); and/or to keys that would complete a key sequence stored in memory (the "will" key for example, as well as the "pronoun" keys). As such, a quick row-column scan involving only the "will" key and the "pronoun" matrix of keys will be completed to thereby expedite the row-column scanning process (this can also occur with respect to stored two, three, etc. character sequences).

Further, if no keys have yet been selected, or the previously selected key has completed one of the stored sequences, then a limited number of keys can be activated which correspond to those keys which occur as the first key in one or more of the stored sequences, i.e., keys which begin a key sequence and/or keys which can access a stored word with a single selection. Corresponding indicators (or highlighting/key differentiation of accessible keys may also be optionally controlled by controller 240. Such limited predictive key access speeds up the row/column scanning process.

Such limited row/column scanning can also similarly occur using quarter row/column scanning. In such a system, the keyboard 20 is scanned in quadrants, with a first upper left quadrant being scanned first on a row by row and then column by column basis, followed by the upper right quadrant, the lower left quadrant, and finally the lower right quadrant for example. Utilizing this quarter row/column scanning technique, only a limited number of keys (for the reasoned described above using regular row/column scanning) in each quadrant (or possibly less than all quadrants, as entire quadrants may be skipped), is scanned for potential selection and only a limited number of indicators need be activated (or a limited number of keys need be differentiated or highlighted). Thus, in regular row/column scanning and in quadrant row/column scanning, upon selection of a key in one matrix, the controller essentially restricts row-column and/or quadrant row/column scanning to a limited number of accessible keys to thereby aid and speed up the scanning process (this can also occur with respect to stored two, three, etc. character sequences).

Alternatively, or as an option which can function concomitantly with the system described above, the system operator may be provided with an auditory prompt or cue during the restricted scanning of rows and columns. As each row is scanned which contains selectable (accessible) keys, keys which can be activated to successfully produce or to lead to the production of a stored word or word phrase, an auditory prompt is generated which informs the system operator as to which row is being scanned. This auditory prompt is pre-defined and is stored in memory 260 to be accessed by microprocessor 240. Since this is designated as an auditory prompt message, it will be generated by the specialized processor 210, while microprocessor 240 configures the analog switch 315 such that the audio output produced is routed to amplifier circuit 335 and thus to external speaker or earphone 365 (if no such circuit or speaker is available, this audio output may optionally be routed through to speaker 230 or amplifier 325 and speaker 345).

Similarly, once input device 220 has been activated to effect the selection of a row, scanning continues across those columns corresponding to a key which can be selected to successfully produce or to lead to the production of a stored word or word phrase. As each such location is scanned, an auditory prompt is generated which informs the system operator as to which particular key location is being scanned. This procedure allows the system operator to use input device 220 and the generated auditory feedback to activate any key location corresponding to any key which can be selected to successfully produce or to lead to the production of a stored message, without scanning through locations corresponding to keys which do not lead to the production of a stored message, and without needing to observe any visual display 270.

Alternatively, this auditory feedback may also be provided simultaneously with the corresponding illumination of visual display 270 to supplement and augment the feedback provided to the system operator during the scanning process. The particular row-column scanning technique described here is used as an illustrative example, and does not limit the present invention nor exclude its application to other similar scanning techniques (such as a column-row scan, quadrant row/column scan, two-switch or three-switch scanning, directed joystick scanning or other scanning technique well known to someone of ordinary skill in the art). The previous embodiment has been described with respect to this particular row-column scanning technique, but it should be noted such auditory feedback could be generated in an appropriate manner to accompany any one of the scanning techniques discussed and contemplated previously and further by any other method as would be apparent to one of ordinary skill in the art, in such a fashion as to enable the user to select the desired keys through such scanning methods using only the auditory feedback thus provided, or if desired through a combination of such auditory and visual feedback as discussed above.

Another type of input device 220 as shown in FIG. 6 can be, for example, a type of switch. The switch can be one utilized in conjunction with microprocessor 240 and memory 260 to access or select certain keys on the keyboard 20, with microprocessor 240 activating certain light emitting diodes 225 corresponding to certain keys 215 on the keyboard 20.

The switch 220 can be any kind which, when it is activated by the user, sends a signal through cable 290 and port 280 to the microprocessor 240, equivalent to key selection. The switch may be one activated by the user's breath (a "puff switch"), by the user's tongue, by movement of the user's head, etc. Thus, the particular type of switch to be utilized as input unit 220 can be suited to a user's needs and ability.

The scanning system can operate in a restricted row-column scanning type of operation (or quadrant scan, etc.), for example, as previously described with regard to FIG. 6. Therefore, when a row containing selectable keys is sequentially accessed by the microprocessor 240 (which contains a key which the user decides to select), a switch of the device 220 is activated (activation is dependent upon the switch utilized, for example, the user may activate the switch by a simple head movement). The hitting of this switch sends a signal which is sent to microprocessor 240 through cable 290 (again, this can be a wired or wireless connection). Subsequently, after the user has activated the switch on the device 220, each of the various columns on the keyboard are then made accessible. When a desired key is made accessible to the user, the user again activates a switch on device 220. Similar to that which has been previously described with regard to FIG. 6, this signal generated by switch 220 is sent to microprocessor 240. Thus, each key selection by activation of the switch 220 requires both a row and column actuation to select a key. The first actuation determines the row and the second actuation determines the column.

FIG. 7 illustrates another preferred embodiment of a word output device 200 of the present invention. Similar to that of FIG. 6, this device 200 includes a controller 240, memory 260 and optional output unit 270, each functioning similar to like components discussed regarding FIGS. 5-6. In this preferred embodiment a keyboard 20, such as that of FIG. 1 for example, is utilized which contains a plurality of keys 215 preferably arranged in rows and columns. Further, each of these keys 215 preferably contains both a visual indicator (LED) 225 and a switch 235. However, contrary to that of FIG. 6, activation or selection of each of the keys 215 on the keyboard 20 is not achieved via activation of a scanned row or column. In this embodiment, activation or selection of each of the keys 215 may be accomplished by a user merely depressing one of the keys 215 with either his finger, a headstick or any other similar type device (not shown), depending on the user's abilities and completing connection of the associated switch 235. Therefore, once a key is depressed, switch 235 is closed and the key 215 is thus activated and selected.

Upon activating or selecting a key, the microprocessor 240 then detects the particular row and column corresponding to that activated key 215. The microprocessor 240 then interacts with memory 260, in a manner similar to that described previously, to access the corresponding word or character corresponding to the selected key 215. Further, the microprocessor 240 can then output voltages of a predetermined level to certain rows and columns of each of the keys, to light visual indicators 235 (or to highlight keys or a matrix of keys if a virtual keyboard is used) corresponding to certain "selectable" keys (selective prediction) to which the voltage of a predetermined level has been supplied. In other words, indicators 235 of only a limited number of keys, capable of completing or continuing a stored sequence (e.g., the "will" key indicator and indicators corresponding to keys of the "pronoun" matrix being lit in response to the initial selection of the "will" key), are activated to thereby predict or aid in selection of "next-keys" in a key sequence. Upon receiving this voltage of a predetermined level from the microprocessor 240, an LED 225 corresponding to key 215 supplied with the voltage of a predetermined level, will then light up. Thus, using a similar type of prediction of available, selectable next-keys in a key sequence (including character keys in two, three, etc., letter character sequences) and/or keys of a matrix grammatically associated with the selected key can be highlighted or differentiated from other keys.

Preferably, the microprocessor 240 not only activates LEDs of available, selectable next-keys, but also activates only such keys for selection and renders other keys to be inaccessible and "locked-out". One problem, however, could result in an inability to easily switch from a mode utilizing words of grammatically linked matrices to a spelling mode, and back again. Such a problem might result from some of the keys being associated with both characters and words (such as the "A/any" key, "L/like" key, etc.). If such inaccessibility or lock-out is to occur via predictive selection, in either the row/column or quadrant row/column scan system of FIG. 6 or the manual scan system of FIG. 7, a mode switching key can be included and/or automatic mode switching can take place.

In an effort to solve the problem of certain keys being inaccessible or locked-out during the automatic predictive selection in the scanning mode or the manual predictive selection in the manual mode, additional short character sequences involving sequences of letters and/or bigrams are preferably stored in memory 260, in association with a command initiating automatic switching into the spelling mode. For example, along with the various key sequences which can be used to activate a word such those shown in the alphabetic dictionary of Appendix I attached hereto, or a word phrase based upon keys of grammatically linked matrices, all potential "next" letter selections can be stored in the look-up table of memory 260 to thereby permit activation of these keys and use of the predictive selection process to enable a switch to a spelling mode. For example, with regard to the "t", sequences involving the t and a potential next letter in an alphabetic sequence can be stored, not in association with a word to be accessed and output, but in association with a command to switch to an automatic spelling mode as part of that sequence macro. Thus, since various words in the English language can begin with "tr" "th", "ti" etc., these character or letter sequences are stored in memory in association with the command to switch to the automatic spelling mode as part of the sequence macro. To the contrary, the short sequence of "tq" is not stored since no words begin with tq, and neither is "tb", "tk", "tv", etc. Thus, only a limited number of "next letters" are predicted in either the manual scan or automatic scanning modes.

Alternatively, all "second" letter keys could be maintained active and all 2-key character sequences stored, such that, upon striking the second key mode switch would occur, thereby enabling input of acronyms, or abbreviations such as "PTO", "TB", etc.

By storing the short sequences in memory, these "next letter" keys stay active during the predictive selection process in the manual mode, and are scanned through as potential activatable keys in the predictive selection row/column scanning mode. Thus, when the "T/think" key is initially selected, since it is a lexical verb (think), the pronoun matrix will remain activated based upon the stored key sequences corresponding to the word phrases "Do I think", "Do we think", etc. Further, these will not be the only keys that are active since the selected key also corresponds to the letter "t". Since memory 260 also stores several short sequences involving the "t", additional character keys will stay active to permit the completion of an English language word in a spelling mode such as the "h" key, the "i" key, the "o" key, etc. Once one of these letter keys is next selected, completing a stored short sequence in memory 260, stored in association with a "mode-switching" command, since the command to switch to an automatic spelling mode is associated with such a key sequence as part of the sequence macro, the automatic spelling mode will be activated and the predictive selection mode will be disable to thereby enable all of the various character keys (or to enable all keys based upon disabling of predictive selection). Such short "alphabetic" key sequences can be stored for each of the various letters of the alphabet to thereby enable this automatic switching into a spelling mode and/or the disabling of the predictive selection mode when utilizing either the row/column scanner or manual input keyboard of FIGS. 6 and 7, for example. Further, this can be applied to the virtual keyboard of FIG. 9 as well.

Similarly, short sequences can also be stored in conjunction with "bigram" to enable an automatic switch to a spelling mode. For example, with respect to the "bl" bigram key, various sequences can be stored involving a single next key selection, such as the vowel keys a, e, i, o, u, for example, such that those keys will be maintained active (predicted) upon initially selecting the bigram key "bl". Since the "bl" bigram co-resides with the word "with", upon that key being selected, the various vowel keys will remain active in the predictive selection mode as will words of other matrices linked with the preposition matrix including the word "with". For example, the articles will remain active. If an article such as "the" is selected, thereby accessing the sequence "with the" based upon key selection of two grammatically linked matrices, then the device will stay in the predictive selection mode. However, if one of the letters is selected, corresponding to the short letter sequence stored in memory 260, such as "bl"+"o"=command to switch to automatic spelling mode, then once the "o" key is selected, predictive selection will be disabled (or alternatively enabled for only alphabetic characters for example) and the device will automatically switch into the automatic spelling mode. As such, keys corresponding to both words and characters or words and bigrams, or even icon/symbols and characters can co-exist on keys by enhancing the predictive selection mode to include "next key" or "next character" selections stored in association with commands automatically switching the device out of the predictive selection mode (in either a manual scanning device or row-column/quadrant row-column scanning device; and using any of the various keyboards or virtual keyboards of the present application) and automatically switching the device into a spelling mode enable access of various character keys.

This switch to a spelling mode can further be done without the need to program every word of the English language into the look-up table of memory 260, with only the "next key" selection, or "next keys" if three keys are needed, being stored which are necessary to determine that the user desires a switch to the spelling mode. As such, the user does not need to utilize a separate key to switch between the predictive selection and spelling mode, and thus an additional keystroke for the user can be saved (which can be extremely valuable for the user who is physically and/or cognitively impaired and has difficulty selecting a key; and which also can be invaluable for the user who wants to seamlessly switch from the predictive selection mode to the spelling mode to save valuable time and effort).

As shown in the dictionary of Appendix I, and as shown in minspeak matrix number 20 of Appendix I, certain of the letter keys can be programmed into the look-up table of memory 260 to be utilized in non-spelling sequences. One such sequence can include selection of a "s" key as a first key, the selection of the "c" key as the next key, and the selection of the "an-state/prov." key to ultimately access the phrase "South Carolina". These state sequences preferably exist for each of the various states in the union as shown in the dictionary of Appendix I. In addition, capitals are also preferably accessible by similarly accessing the same state abbreviation (the s key plus the c key), along with the key "the-capital", wherein if the "s"+"c"+"the-capital" keys are sequentially activated, the capital of South Carolina, "Columbia", will be accessed.

Accordingly, there are already some preprogrammed sequences which will maintain activation of various letters when a first letter is selected, and which do not correspond to an automatic switching to the automatic spelling mode. The same sequences, such as the "s"+"c" can also correspond to words in the English language such as "scare". Since a user can access the word South Carolina or its capital Columbia using the "s"+"c" keys, followed by either the "state/prov." key or the "capitol" key, additional letters must be stored in memory along with the command, to switch to the automatic spelling mode in conjunction with these letters. Thus, when selecting the "s" key, the device stays in the predictive selection mode and predicts all potential next letters which can form a word such as "a", "c", "r", etc. If the "a" key is activated, since this does not correspond to a state or capital, and since the sequence "s"+"a"+ command to switch to automatic spelling mode is preferably stored in memory 260, an automatic switch to the spelling mode occurs and the predictive selection aspect is removed. If, however, the "c" key is selected after the "s" key, since there is still a potential sequence which can occur ("s"+"c"+"capital"/"state/prov."), the device stays in the predictive selection mode (the sequence "s"+"c"+ command to switch to the automatic spelling mode is preferably not stored in memory 260), and the device waits for a next key selection. If the state/prov. key is selected or the capital key is selected, the corresponding state or capital is output from memory and the device stays in the predictive selection mode. If, however, the "a" key is then activated, forming the sequence "sca", since this sequence is preferably stored in memory 260 along with a command to switch to the automatic spelling mode, the device switches out of the predictive selection mode and into the automatic spelling mode. As such, switching to the automatic spelling mode can even be used in situations where letters are used as part of a grammatical matrix (for example, a matrix of letter combinations which can be used in association with the one key capital matrix or the one key state/prov. matrix to access states and capitals), including letters of the matrix grammatically linked to other matrices, which can also be used in a spelling mode.

In addition, such a concept can also be similarly applied to mode switching in a predictive selection system using polysemous icons (with or without "word" keys and with or without "word" keys in grammatically linked matrices) and character keys, such as that shown in U.S. Pat. No. 5,297,041. In such a system, short letter groups can be stored in memory as sequences, in addition to the icon sequences, to thereby maintain predictive selection and enable automatic switching to a "spelling" mode in a manner similar to that described above. It should be noted that the aspects of icon sequence storage and retrieval as discussed in U.S. Pat. No. 5,297,041 are specifically incorporated herein by reference.

Alternately, or as an option which can function concomitantly with the system described above with regard to FIG. 7 (with or without automatic mode switching), the system operator may be provided with an auditory prompt or cue when directly activating individual keys. As a particular key 215 is activated which corresponds to a word which can be selected to successfully produce or to lead to the production of a stored word or word phrase, an auditory prompt is generated which informs the system operator as to the word associated with that key. This auditory prompt is pre-defined and is stored in memory 260 to be accessed by microprocessor 240.

Since this is designated as an auditory prompt message, it will be generated by the specialized processor 210, while microprocessor 240 configures the analog switch 315 such that the audio output produced is routed to amplifier circuit 335 and thus to external speaker or earphone 365 (if no such circuit or speaker is available, this audio output may optionally be routed through amplifier circuit 325 and thus to speaker 345 or straight to speaker 230). If the particular key which is activated does not correspond to a word which can be selected to successfully produce or to lead to the production of a stored word or word phrase, the same auditory prompt may be generated to inform the system operator as to the word associated with that key will not successfully produce or to lead to the production of a stored word or word phrase following the previously activated key.

Once a particular key 215 is activated by closing the switch 235 associated through some type of direct physical contact, the associated auditory prompt will begin to be spoken through the private auditory feedback channel as described above, and will continue to be spoken as long as the key 215 remains depressed. A timer will also be started to measure how much time has elapsed since the key 215 was first depressed. If on hearing the associated auditory prompt, the user determines that this is the key 215 which he wishes to activate, the activation can be effected by maintaining the key 215 in a depressed stated beyond a predetermined time threshold. Alternatively, the user may release the key 215 and then depress it once again within the same time window as above to immediately effect the activation of that key 215 at the time of the second depression (even though this occurs prior to the expiration of the time threshold required for activation by continuously holding the key down). As above in the case of auditory scanning methods, this auditory feedback may also be provided simultaneously with the corresponding illumination of visual display 270 (LEDs, for example) to supplement and augment the feedback provided to the system operator during the key selection and activation process. The particular method for direct activation of keys as described herein is used as an illustrative example, and does not limit the present invention nor exclude its application to other similar direct selection techniques (such as a proportional joystick, headpointing system or other selection technique well know to someone of ordinary skill in the art). Some examples of such techniques are briefly described below.

Any number of input devices can be utilized in place of the above-mentioned headstick. Such devices can send signals from a separate unit (not shown) to the microprocessor 240 (through a wired or wireless connection through port 280), for example, to simulate specific key activation. Further, some of these devices 245 can be utilized in conjunction with an output device 270 controlled by microprocessor 240. Some examples of such devices will subsequently be explained.

One type of input device which may be utilized is the optical headpointer used with the "Light Talker". The "Light Talker" device contains a detection device which can be worn on a user's head. As the microprocessor 240 detects activation of a particular row and column corresponding to a key, and interacts with memory 260, the microprocessor 240 then lights certain LED's 225 on certain keys (it will be subsequently described how these certain keys are selected). The LED's for each of the selected keys are then sequentially pulsed (at a rate of approximately 30 times a second, for example) at a higher voltage than the keys are not thus selected. The user then turns his head to orient the optical headpointer toward the desired one of the selected keys which he wishes to activate. The detection device of the "Light Talker" then detects light from the pulsing LED's. A signal is sent from the optical headpointer of "Light Talker" through a cable or wireless connection, and to microprocessor 240. The microprocessor 240 then determines, from the time of light detection by the detection device, toward which one of the keys the optical headpointer is pointed. As the key is determined by the microprocessor 240, the device thus has achieved simulated specific key activation by maintaining the orientation of the headpointer toward this key past a predetermined time threshold (without the need for the user to physically depress any of the actual keys). It should be noted that this specific example is described regarding simulated key activation after a first key has been selected. However, when selecting a first key, the same process is utilized with each of the LED's being sequentially pulsed at the same voltage level.

A second example of a device which may be utilized as a simulated key activation is that of the "Headmaster" described in U.S. Pat. No. 4,682,159, which is incorporated herein by reference. The "Headmaster" is an ultrasonic device Which sits on a user's head, similar to the "Light Talker", and contains a plurality of detectors. The device is connected to the microprocessor 240 by a wired or wireless connection, through an input port 280. Similar to the description given regarding the above-mentioned "Light Talker", the "Headmaster" operation will subsequently be described corresponding to the microprocessor 240 initially having detected the row and column of a first key. The simulated activation of this first key, it should be noted, can occur through operation of the headmaster in a similar manner as will now be described in relation to simulated activation of a subsequent key.

Upon the microprocessor 240 detecting activation of a particular row and column corresponding to a first key, and interacting with memory 260, the microprocessor 240 then sends a signal to output device 270. Further, similar to that described previously regarding the "Light Talker", LED's corresponding to certain selected keys will be lit by the microprocessor 240. In the case of the "Headmaster", the output device outputs a sound wave or audible signal. However, the present invention is not limited to such an audible output device. One of ordinary skill would realize that any output device could be utilized such as that of an infrared light emitter (or similar light or sound output device), in conjunction with a corresponding detector on the device, such as an infrared detector (or similar light or sound received device). Further, the present invention is not limited to visual indicators being lit as corresponding to certain selected keys. Other indicators, such as audible indicators, can be used either separately or in conjunction with the visual indicators.

The headpiece of the "headmaster" contains a plurality of detectors, for example, three, which can detect the angle of the headpiece with respect to the output signal wave, so that the user can orient the headpiece toward the key on the keyboard that the user desires to activate (simulate activation). Thus, the user need only move his head to orient toward a desired key, corresponding to one of the certain previously lit keys (it will subsequently be described how keys are selected to be lit), to thus simulate activation of that particular key. The detectors send signals corresponding to the detected angles of the sound wave back to the microprocessor 240. The detectors can send positional signals or signals related to change of position of a user's head.

The microprocessor 240 then can translate this change of position into x and y coordinates and correspond the x and y coordinates to the keyboard to thus simulate activation of a selected key.

Further, regarding the predictive aspect of the present invention, by the user utilizing the "Headmaster", x and y coordinates are related to the keyboard to simulate activation of a key, as previously described. However, if this simulation results in detection by microprocessor 240 of a key which is not one of the certain previously lit keys (referenced previously and to be described subsequently in detail), no simulated activation of that key will occur. However, by utilizing a system such as the "Headmaster" in combination with a predictive system limiting key activation to only certain specific keys, the microprocessor 240 can then simulate activation of the closest possible selectable key to thereby allow a user a certain margin of error in positioning his head to select a key. This will greatly improve accuracy of simulated key input.

A further example of an input device is that of an infrared light detector to detect light angle and relay x and y coordinates, similar to the "Headmaster" as previously described. Further, the present invention is not limited to these previously described input devices. Any device which one of ordinary skill in the art would readily recognize as utilizable in such a system as that of either embodiment of the present invention could be substituted. Further, a modification of the previously mentioned input devices, to suit the device to a particular user's needs, abilities, or limitations, within the purview of one of ordinary skill in the art may also be utilized. Thus, instead of a headpiece, sensors on another movable body part, under selectable control by the user can also be utilized.

Hereinafter, the embodiment of FIG. 7 will be described with regard to direct activation of keys on the keyboard (by a user pressing a key with his finger, for example), but it should be noted that selection, or simulated activation may occur by any one of the input devices discussed and contemplated previously and further by any other method as would be apparent to one of ordinary skill in the art. Thus, direct selection of keys is utilized for illustrative purposes only and should not in any way be considered limiting with regard to the present invention.

Through the use of the various components of the word output device 200, the components can conjunctively be utilized to detect activation of the system, (i.e., an ON switch, not shown) and the activation of a first of a plurality of keys (and subsequent keys) on the keyboard and for determining the word corresponding to the activated key in the microprocessor 240. Further, the memory 260 stores a plurality of key sequences, each with a plurality of word or word phrases corresponding to a plurality of keys on the keyboard. The microprocessor 240 can then access the memory 260 to compare the selected key to the key sequences stored in the memory 260, to determine which of the plurality of key sequences begin with the detected key and which matrix/matrices of keys are associated or grammatically linked to the selected key (for example); as well as which of the plurality of keys 215 on the keyboard 20 correspond to each of the plurality of key sequences or matrix/matrices contain the selected key. Finally, the microprocessor 240 may output a voltage of a predetermined level to visual indicators 225 (and/or audible indicators) to activate a visual indicator (and/or an audible indicator) on each of a plurality of keys 215 determined to correspond to each of the plurality of key sequences containing the initially selected key or in an associated matrix thereof, to thereby define the limited number of keys which can produce a stored word or word phrase involving the initially detected key.

Figure 8:
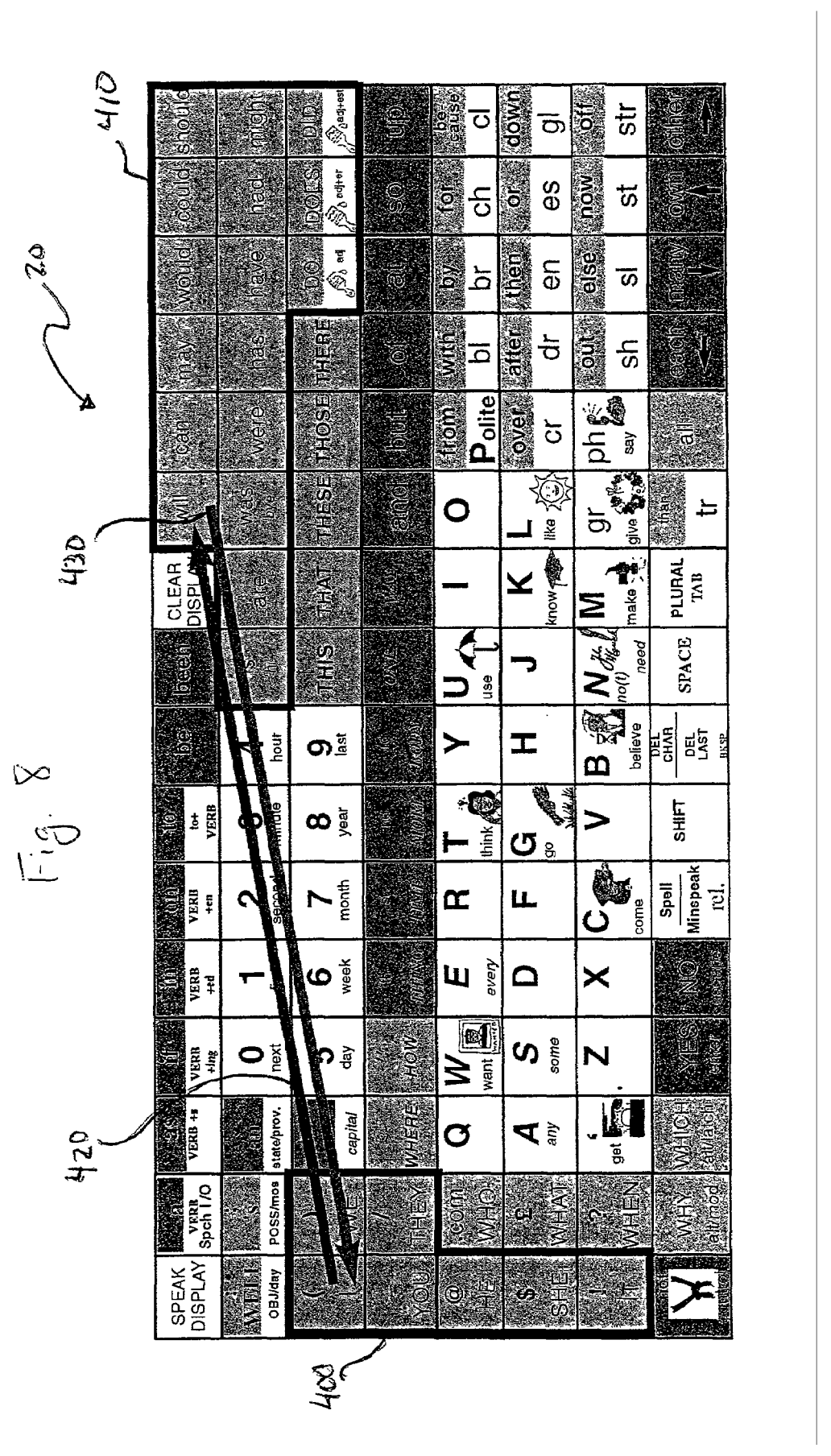

FIG. 8 includes one example of matrix use of the present application. FIG. 8 is merely conceptual and highlights how matrices can be used to aid a user in selecting grammatically linked word phrases.

A first matrix of keys 400 includes a matrix of pronoun keys which are grammatically associated (they are all pronouns). Upon selecting a pronoun key such as "I", following the arrow 420, a user is led (by some type of indicator or differentiation of keys such as highlighting; or by a restricted row-column or quadrant row-column type scan) to a second matrix of keys 410. In other words, controller 240 identifies the selected "I" key, checks memory 260 for keys that would complete a stored key sequence and/or keys of a grammatically linked matrix, and optionally activates indicators, restricts a scan, or highlights such keys (assuming that the only stored grammatically linked matrix is the modal/auxiliary verb matrix 410 for example purposes only since the lexical verb matrix would also be found). From here, the user can easily select from one of a plurality of grammatically associated keys grouped together, wherein this matrix 410 is grammatically linked to the matrix 400. Thereafter, the user can select an appropriate auxiliary or modal/auxiliary verb to complete a phrase stored in memory 260, such as "I will".

By segmenting the auxiliary or modal/auxiliary verbs from the lexical verbs, for example, the question phrases can also be easily generated as indicated by the arrow 430. For example, the word "will" can be first selected, wherein the user will then be led to the matrix 400 to select an appropriate pronoun to follow the word "will", to form a co-occurrence of words such as "will I". Simple rules can be developed for the word output device 200 so as to easily associate or link matrices together to thereby form a simple system which allows users to easily access words such as core words, which preferably constitute 60-80 percent of total words used in sample speech. It should be noted, of course, that when the word "I" is first selected, the lexical verbs can be highlighted or indicated as a group, in addition to the auxiliary or modal verbs to thereby give the user a choice of verbs for selection. Similarly, additional keys forming further matrices may also be highlighted, such as the "not" key, to thereby enable creation of words including negative phrases such as I+will+not=I will not; will+I+not=will I not; I+not+will=I won't; and will+not+I=Won't I.

Figure 9:
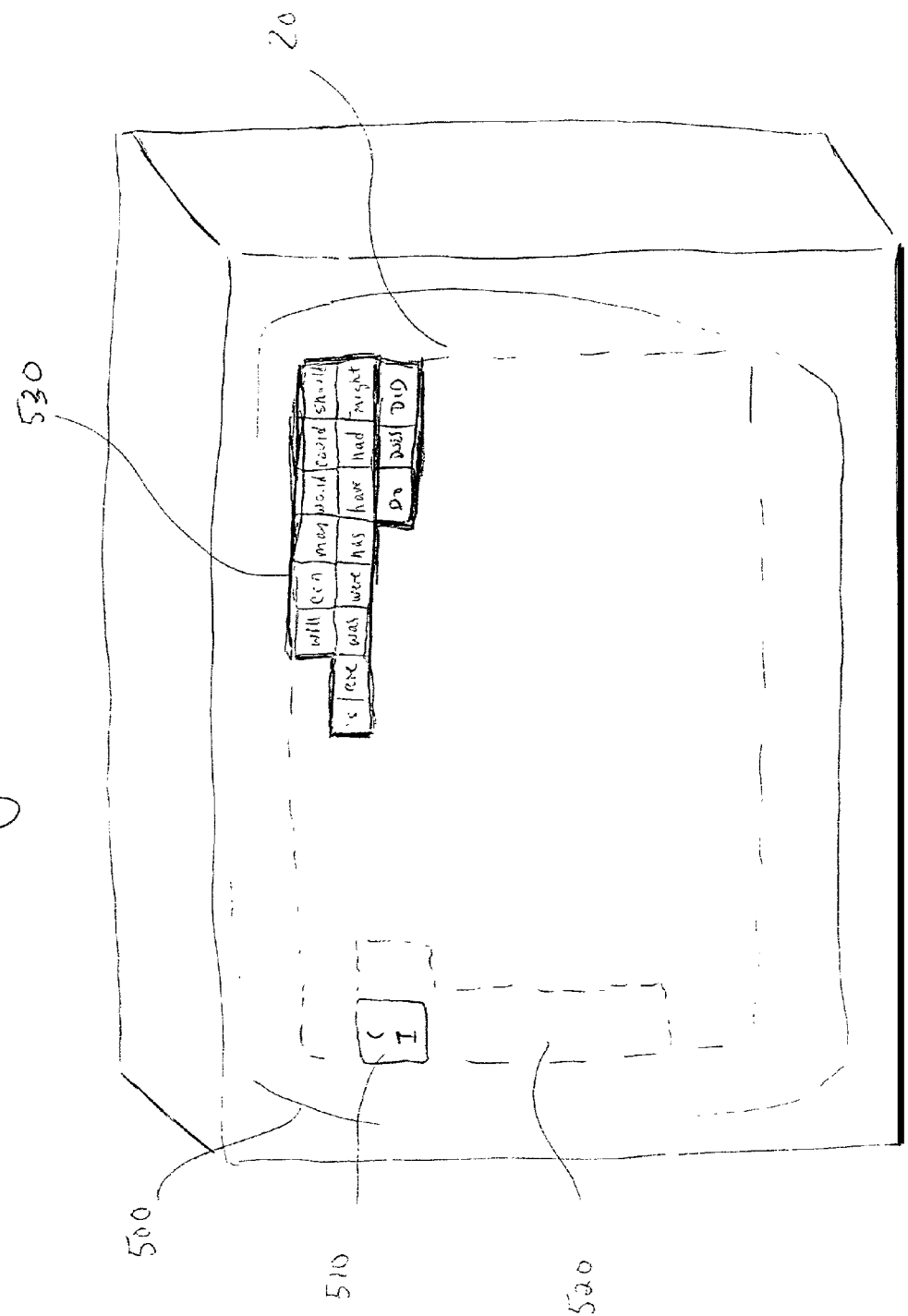
FIG. 9 is an example of a virtual keyboard of another embodiment of the present application.

FIG. 9 provides a schematic illustration of a virtual keyboard 20 displayed on an integrated input and display device 500 of the overall device, including components similar to those previously described with regard to FIGS. 5-7, for example. The overall system may include a separate standard keyboard with keys associated with corresponding virtual keys and/or a keyboard display portion separated from an additional display portion (not shown). The example shown in FIG. 9 illustrates how certain keys can be differentiated, such as by being highlighted for example, from other keys when a key in a related matrix is selected. In the example shown in FIG. 9, the "I" key 510 within the pronoun matrix 520 is initially selected. Upon being selected, keys of the auxiliary or modal/auxiliary matrix 530 can then be highlighted to thereby aid the user in selecting a next related key to form a co-occurring word or word phrase, for example. Again, although not shown in FIG. 9, when a pronoun such as "I" is selected, the lexical verb matrix can also be highlighted or indicated, along with the auxiliary or modal/auxiliary matrix. Thus, the keyboard of the present application can be a physically separate device 20 such as that shown in FIG. 5, which is part of an overall system 200, and/or can include a virtual keyboard such as that shown in FIG. 9 for example, which may be embodied in an integrated input and display device. Such a virtual keyboard can be used in either a manual or scanner predictive selection mode; and can also be used in conjunction with the automatic mode switching aspect of the present invention. Even more preferably, the system 200 is a speech synthesizer which includes a keyboard of FIG. 1 or a virtual keyboard of FIG. 9, wherein selection of keys accesses and outputs associated words.

Although the present application has been described utilizing various specific examples, it will be apparent that the same may be varied in many ways. Such variations are not to be regarded as a departure from the spirit and scope of the invention, and all such modifications as would be obvious to one of ordinary skill in the art are intended to be included within the scope of the claims. For example, the same principles emphasized above with regard to the English language can be used in any highly morphogized language to represent complex morphological structures, and can therefore be applied to languages such as German or French. Matrices can be constructed without the use of icons to produce a dramatic reduction in keystrokes as well as a dramatic reduction in the steps required for scanning, in an English or any other language based system.

Further, although the invention has been preferably described as a keyboard used in association with or integrated into an output device such as the speech synthesizer, it should be clear that such a keyboard arrangement of the present application can also be used in any computer-type environment such as with a personal computer, laptop device, etc. The computer device need merely be programmed in a manner similar to that of the speech output or speech synthesis device of the present application shown in FIGS. 5-7. In the alternative, the keyboard can be implemented as a virtual keyboard on a personal or laptop computer device, accessible via integrated and input display panel and/or through associated keys on a keyboard. In addition, it should be noted that the overall word output device shown in FIGS. 5-7 of the present application can also be linked to a personal computer for use in conjunction therewith. These and other modifications and variations are to be included within the scope of the claims.

What is claimed is:

1. A keyboard comprising:
a plurality of keys of a first common color and arranged in a first matrix, wherein keys of the first matrix are similarly grammatically associated and at least a portion thereof are grouped together, the first common color indicating a common number of actuations necessary to access an associated word, word phrase or character; and
a plurality of keys of a second common color, different from the first common color, and arranged in at least one additional matrix, wherein keys of the at least one additional matrix are similarly grammatically associated and at least a portion thereof are grouped together, the second common color indicating a second common number of actuations necessary to access an associated word, word phrase or character, the second common number of actuations being different from the first common number of actuations.

2. The keyboard of claim 1, wherein a majority of the keys on the keyboard are associated with a word.

3. A speech synthesizer, including the keyboard of claim 2, wherein selection of keys enables access and output of associated words.

4. The keyboard of claim 1, wherein at least one of the matrices includes keys associated with words.

5. The keyboard of claim 4, wherein the words associated with keys of at least one of the matrices are of a common part of speech.

6. The keyboard of claim 1, further comprising:
a plurality of keys of a third common color, different from the first and second common color, arranged in at least one further matrix, wherein keys of the further matrix are similarly grammatically associated and at least a portion thereof are grouped together, the third common color indicating a third common number of actuations necessary to access an associated word, word phrase or character, the third common number of actuations being different from at least one of the first and second common number of actuations.

7. The keyboard of claim 1, wherein the keyboard includes keys associated with core language words.

8. The keyboard of claim 1, wherein one matrix includes keys associated with pronouns.

9. The keyboard of claim 1, wherein one matrix includes keys associated with lexical verbs.

10. The keyboard of claim 1, wherein lexical verbs and modal/auxiliary verbs are associated with keys of different matrices.

11. The keyboard of claim 1, wherein the keyboard further comprises:
a plurality of indicators, each associated with one of the plurality of keys.

12. The keyboard of claim 11, wherein selection of a key in one matrix enables activation of indicators associated with keys of at least one additional matrix.

13. The keyboard of claim 12, wherein at least one of the matrices includes keys associated with words.

14. The keyboard of claim 13, wherein the words associated with keys of at least one of the matrices are of a common part of speech.

15. The keyboard of claim 12, wherein one matrix is grammatically linked to another matrix such that selection of a key in one matrix enables indicators of keys in at least one grammatically linked matrix.

16. A speech synthesizer, including the keyboard of claim 12, wherein selection of keys enables access and output of associated words.

17. The keyboard of claim 11, wherein the indicators include lights.

18. The keyboard of claim 1, wherein the keyboard is displayed as a virtual keyboard.

19. The keyboard of claim 18, wherein the keyboard is embodied in an integrated input and display device.

20. The keyboard of claim 18, wherein, upon selection of a key in one matrix, at least one key is differentiated from other keys of the keyboard.

21. The keyboard of claim 20, wherein the differentiation includes highlighting.

22. The keyboard of claim 1, wherein one matrix is grammatically linked to another matrix.

23. A speech synthesizer, including the keyboard of claim 22, wherein selection of keys enables access and output of associated words.

24. The keyboard of claim 1, wherein selection of a key of the first color permits access of an associated word upon being selected one time.

25. The keyboard of claim 24, wherein selection of a key of the second color, different from the first color, permits access of an associated word upon being selected two times in succession or upon two different keys of the second color being selected.

26. A speech synthesizer, including the keyboard of claim 1, wherein selection of keys enables access and output of associated words.

27. The keyboard of claim 1, wherein keys of at least one of the first and second matrices are grouped together based upon location on the keyboard, in proximate relation to one another.

28. The keyboard of claim 1, wherein keys of at least one of the first and second matrices are grouped together based upon at least one of common concept, common morphology, and common cognitive relationship.

29. The keyboard of claim 28, wherein keys of at least one of the first and second matrices are not located proximate to one another.

30. A virtual keyboard comprising:
a plurality of keys of a first common color arranged in a first matrix, wherein keys of the first matrix are similarly grammatically associated and at least a portion thereof are grouped together, the first common color indicating a common number of actuations necessary to access an associated word, word phrase or character; and
a plurality of keys of a second common color arranged in at least one additional matrix, wherein keys of the at least one additional matrix are similarly grammatically associated and at least a portion thereof are grouped together, wherein upon selection of a key in one matrix, keys of another matrix are differentiated from other keys of the keyboard, the second common color indicating a second common number of actuations necessary to access an associated word, word phrase or character, the second common number of actuations being different from the first common number of actuations.

31. The keyboard of claim 30, wherein the differentiation includes highlighting.

32. The keyboard of claim 30, wherein upon selection of a key in one matrix, keys of another grammatically linked matrix are differentiated from other keys of the keyboard.

33. A keyboard, comprising:
a plurality of keys arranged in a first matrix, keys of the first matrix being similarly grammatically associated and associated with a common first color, the first common color indicating a common number of selections necessary to access an associated word, word phrase or character; and
a plurality of keys arranged in a second matrix, keys of the second matrix being similarly grammatically associated and associated with a common second color, different from the first color, the second common color indicating a common second number of selections, different from the first number, necessary to access an associated word, word phrase or character.

34. The keyboard of claim 33, further comprising:
a plurality of keys arranged in a third matrix, keys of the third matrix being associated with a third color, different from the first and second color, the third common color indicating a third common number of actuations necessary to access an associated word, word phrase or character, the third common number of actuations being different from at least one of the first and second common number of actuations.

35. The keyboard of claim 34, wherein keys of the third color are associated with a character including at least one of a letter, number and a bigram.

36. The keyboard of claim 33, wherein at least one of the matrices includes a plurality of sub-matrices.

37. The keyboard of claim 36, wherein keys of at least one sub-matrix are similarly grammatically associated.

38. The keyboard of claim 37, wherein keys of multiple sub-matrices are grammatically linked.

39. A speech synthesizer, including the keyboard of claim 33, wherein selection of keys enables access and output of associated words.

40. A word output device, comprising:
a keyboard including,
a plurality of keys of a first common color and arranged in a first matrix, wherein keys of the first matrix are similarly grammatically associated and at least a portion thereof are grouped together, the first common color indicating a common number of actuations necessary to access an associated word, word phrase or character, and
a plurality of keys of a second common color, different from the first common color, and arranged in at least one additional matrix, wherein keys of the at least one additional matrix are similarly grammatically associated and at least a portion thereof are grouped together, the second common color indicating a second common number of actuations necessary to access an associated word, word phrase or character, the second common number of actuations being different from the first common number of actuations;
a memory, adapted to store words, word phrases or characters in association with one or more of the plurality of keys;
a controller, adapted to access a stored word, word phrase or character in response to selection of one or more of the plurality of keys; and
an output unit, adapted to output the accessed word, word phrase or character.

41. The output device of claim 40, wherein a majority of the keys on the keyboard are associated with a word.

42. The word output device of claim 41, wherein the output device includes a speech synthesizer.

43. The word output device of claim 40, wherein the words associated with keys of at least one of the matrices are of a common part of speech.

44. The word output device of claim 40, wherein the keyboard includes keys associated with core language words.

45. The word output device of claim 40, wherein one matrix includes keys associated with pronouns.

46. The word output device of claim 40, wherein one matrix includes keys associated with lexical verbs.

47. The word output device of claim 40, wherein lexical verbs and modal/auxiliary verbs are associated with keys of different matrices.

48. The word output device of claim 40, wherein the output device further comprises:
a plurality of indicators, each associated with one of the plurality of keys.

49. The word output device of claim 48, wherein the indicators include lights.

50. The word output device of claim 40, wherein, upon selection of a first key in a first matrix, the controller activates indicators corresponding to keys in another matrix.

51. The word output device of claim 40, wherein the memory is adapted to store a plurality of words and word phrases, stored in association with at least one of a single key and a sequence of keys.

52. The word output device of claim 51, wherein upon selection of first key, the controller activates indicators corresponding to keys that correspond to a stored next key in a stored key sequence in the memory.

53. The word output of claim 52, wherein at least one stored word is associated with a sequence including a single key listed twice, and wherein, upon selection of a first key, the controller activates the indicator corresponding to the selected key.

54. The word output device of claim 52, wherein the output device includes a speech synthesizer.

55. The word output device of claim 51, wherein the memory is further adapted to store a command for switching the device into a spelling mode, in association with a sequence of at least two keys corresponding to alphabetic characters.

56. The word output device of claim 55, wherein upon selection of a first key, the controller activates indicators corresponding to keys that correspond to a stored next key in a stored key sequence in the memory, including sequences of at least two alphabetic characters.

57. The word output device of claim 56, wherein upon selection of a last key in a stored sequence of at least two keys corresponding to alphabetic characters, stored in association with a command for switching the device into a spelling mode, the device automatically switches into a spelling mode, wherein indicators corresponding to all keys are activated.

58. The word output device of claim 56, wherein upon selection of a last key in a stored sequence of at least two keys corresponding to alphabetic characters, stored in association with a command for switching the device into a spelling mode, the device automatically switches into a spelling mode, wherein indicators corresponding to alphabetic characters are activated.

59. The output device of claim 40, wherein the output device further comprises:

a plurality of indicators, each associated with one of the plurality of keys.

60. The word output device of claim 59, wherein upon selection of a key in one matrix, the controller activates indicators associated with keys of at least one additional matrix.

61. The output device of claim 60, wherein a majority of the keys on the keyboard are associated with a word.

62. The word output device of claim 40, wherein keys of one matrix are grammatically linked to keys of another matrix.

63. The word output device of claim 40, wherein the output device includes a speech synthesizer.

64. The word output device of claim 40, further comprising:
a row-column scanner, adapted to successively access keys of rows and columns of the keyboard for selection.

65. The word output device of claim 64, wherein the memory is adapted to store a plurality of word, word phrase or character, stored in association with at least one of a single key and a sequence of keys.

66. The word output device of claim 65, wherein, upon controller selection of a first key, the controller essentially restricts the row-column scanner to access of keys that correspond to a stored next key in a key sequence stored in the memory.

67. The word output device of claim 64, wherein, upon selection of a first key, the controller essentially restricts the row-column scanner to access of keys that correspond to a stored next key sequence stored in the memory.

68. The word output device of claim 64, wherein the memory is adapted to store a plurality of word phrases, stored in association with a sequence of at least two keys including one key of one matrix and at least one key of a different grammatically linked matrix.

69. The word output device of claim 68, wherein, upon selection of a first key in a first matrix, the controller essentially restricts the row-column scanner to access of keys in at least one other different grammatically linked matrix.

70. The word output device of claim 68, wherein the memory is further adapted to store a command for switching the device into a spelling mode, in association with a sequence of at least two keys corresponding to alphabetic characters.

71. The word output device of claim 70, wherein, upon the selection of a first key in a first matrix, the controller essentially restricts the row-column scanner to access of keys in at least one different grammatically linked matrix, wherein upon the selected key also being part of a stored sequence of alphabetic characters, the controller permits the row-column scanner to access a next key of the stored alphabetic character sequence.

72. The word output device of claim 71, wherein upon the selection of a last key in a stored sequence of at least two keys corresponding to characters, stored in association with a command for switching the device into a spelling mode, the device automatically switches into a spelling mode wherein the row-column scanner is no longer restricted.

73. The word output device of claim 71, wherein upon the selection of a last key in a stored sequence of at least two keys corresponding to characters, stored in association with a command for switching the device into a spelling mode, the device automatically switches into a spelling mode, wherein the row-column scanner is restricted to access of keys corresponding to alphabetic characters.

74. The word output device of claim 71, wherein, upon the selection of a first key, the controller essentially restricts selection to next keys of a stored sequence, including stored sequences of at least two alphabetic characters.

75. The word output device of claim 74, wherein upon selection of a last key in a stored sequence of at least two keys corresponding to alphabetic characters, stored in association with a command for switching the device into a spelling mode, the device automatically switches into a spelling mode, wherein selection of next keys is no longer restricted.

76. The word output device of claim 74, wherein upon selection of a last key in a stored sequence of at least two keys corresponding to alphabetic characters, stored in association with a command for switching the device into a spelling mode, the device automatically switches into a spelling mode, wherein the row-column scanner is restricted to access of keys corresponding to alphabetic characters.

77. The word output device of claim 71, wherein upon the selected key also being part of a stored sequence of alphabetic characters, the controller permits the row-column scanner to access a next key of stored alphabetic character sequence.

78. The word output device of claim 77, wherein upon the selection of a last key in a stored sequence of at least two keys corresponding to characters, stored in association with a command for switching the device into a spelling mode, the device automatically switches into a spelling mode wherein the row-column scanner is no longer restricted.

79. The word output device of claim 64, wherein keys of one matrix are grammatically linked to keys of another matrix.

80. The word output device of claim 79, wherein, upon the selection of a first key in a first matrix, the controller essentially restricts the row-column scanner to access of keys in at least one other different grammatically linked matrix.

81. The output device of claim 64, wherein the keyboard further includes:
a plurality of indicators, each associated with one of the plurality of keys.

82. The word output device of claim 81, wherein upon the selection of a key in one matrix, the controller activates indicators associated with keys of at least one additional matrix.

83. The output device of claim 81, wherein the indicators include lights.

84. The output device of claim 64, wherein selection of a key of a first color permits access of an associated word upon being selected one time.

85. The output device of claim 84, wherein selection of a key of a second color, different from the first color, permits access of an associated word, word phrase or character upon being selected two times in succession.

86. The word output device of claim 64, wherein the output device includes a speech synthesizer.

87. The word output device of claim 64, wherein the row-column scanner is a quadrant row-column scanner, adapted to successively access quadrants of rows and columns of keys for selection.

88. The word output device of claim 87, wherein, upon selection of a first key, the controller essentially restricts the quadrant row-column scanner to access of keys that correspond to a stored next key in a key sequence stored in the memory.

89. The word output device of claim 87, wherein, upon the selection of a first key in a first matrix, the controller essentially restricts the quadrant row-column scanner to access of keys in at least one other different grammatically linked matrix.

90. The word output device of claim 64, wherein the memory is further adapted to store a command for switching the device into a spelling mode, in association with a sequence of at least two keys corresponding to alphabetic characters.

91. The word output device of claim 90, wherein, upon the selection of a first key in a first matrix, the controller essentially restricts the row-column scanner to access of keys in at least one different grammatically linked matrix, wherein upon the selected key also being part of a stored sequence of alphabetic characters, the controller permits the row-column scanner to access a next key of the stored alphabetic character sequence.

92. The word output device of claim 91, wherein upon the selection of a last key in a stored sequence of at least two keys corresponding to characters, stored in association with a command for switching the device into a spelling mode, the device automatically switches into a spelling mode wherein the row-column scanner is no longer restricted.

93. The word output device of claim 91, wherein upon the selection of a last key in a stored sequence of at least two keys corresponding to characters, stored in association with a command for switching the device into a spelling mode, the device automatically switches into a spelling mode, wherein the row-column scanner is restricted to access of keys corresponding to alphabetic characters.

94. The word output device of claim 40, wherein keys of at least one of the first and second matrices are grouped together based upon location of the keyboard, in proximate relation to one another.

95. The keyboard of claim 40, wherein keys of at least one of the first and second matrices are grouped together based upon at least one of common concept, common morphology, and common cognitive relationship.

96. The keyboard of claim 95, wherein keys of at least one of the first and second matrices are not located proximate to one another.

97. A word output device, comprising:
a virtual keyboard including,
a plurality of keys of a first common color arranged in a first matrix, wherein keys of the first matrix are similarly grammatically associated and at least a portion thereof are grouped together, the first common color indicating a common number of actuations necessary to access an associated word, word phrase or character, and
a plurality of keys of a second common color arranged in at least one additional matrix, wherein keys of the at least one additional matrix are similarly grammatically associated and at least a portion thereof are grouped together, the second common color being different from the first common color and indicating a second common number of actuations necessary to access an associated word, word phrase or character, the second common number of actuations being different from the first common number of actuations;
a memory, adapted to store words, word phrases or characters in association with one or more of the plurality of keys;
a controller, adapted to access a stored word, word phrase or character in response to selection of one or more of the plurality of keys; and
an output unit, adapted to output the accessed word, word phrase or character, wherein, upon selection of a first key, the controller differentiates display of at least one key from other keys on the keyboard.

98. The word output device of claim 97, wherein the keyboard and output unit are integrated as an input and display device.

99. The word output device of claim 97, wherein, upon selection of a key in one matrix, the controller differentiates display of keys in another matrix from other keys on the keyboard.

100. The output device of claim 99, wherein the differentiation includes highlighting.

101. The word output device of claim 99, wherein keys of the differentiated matrix are grammatically linked to keys of the matrix including the selected key.

102. The word output device of claim 97, wherein the memory is adapted to store a plurality of word phrases, stored in association with a sequence of at least two keys including one key of one matrix and at least one key of a different grammatically linked matrix, wherein the memory is further adapted to store a command for switching the device into a spelling modes, in association with a sequence of at least two keys corresponding to alphabetic characters.

103. The word output device of claim 97, wherein upon selection of a first key, the controller differentiates display of keys that correspond to a stored next key in a stored sequence in memory, including stored sequences of at least two alphabetic characters, from other keys.

104. The word output device of claim 103, wherein upon selection of a last key in a stored sequence of at least two keys corresponding to alphabetic characters, stored in association with a command for switching the device into a spelling mode, the device automatically switches into a spelling mode, wherein keys are no longer differentiated from other keys.

105. The word output device of claim 104, wherein the differentiation includes highlighting.

106. The word output device of claim 103, wherein upon selection of a last key in a stored sequence of at least two keys corresponding to alphabetic characters, stored in association with a command for switching the device into a spelling mode, the device automatically switches into a spelling mode, wherein keys corresponding to alphabetic characters are differentiated from other keys.

107. The word output device of claim 106, wherein the differentiation includes highlighting.

108. The word output device of claim 103, wherein the differentiation includes highlighting.

109. A word output device, comprising:
a keyboard including,
a plurality of keys of a first color arranged in a first matrix, wherein keys of the first matrix are similarly grammatically associated and at least a portion thereof are grouped together, the first color indicating a common number of actuations necessary to access an associated word, word phrase or character, and
a plurality of keys of a second color arranged in at least one additional matrix, wherein keys of the at least one additional matrix are similarly grammatically associated and at least a portion thereof are grouped together, the second color being different from the first color and indicating a second common number of actuations necessary to access an associated word, word phrase or character, the second common number of actuations being different from the first common number of actuations;

a memory, adapted to store words, word phrases or characters in association with one or more of the plurality of keys;

a controller, adapted to access a stored word, word phrase or character in response to selection of one or more of the plurality of keys; and an output unit, adapted to output the accessed word, word phrase or character, wherein the memory is adapted to store a plurality of word phrases, stored in association with a sequence of at least two keys including one key of one matrix and at least one key of a different matrix.

110. The word output device of claim 109, wherein, upon selection of a first key in a first matrix, the controller activates indicators corresponding to keys in another matrix.

111. The word output device of claim 109, wherein selection of a key of a first color permits access of an associated word, word phrase or character upon being selected one time.

112. The word output device of claim 111, wherein selection of a key of a second color, different from the first color, permits access of an associated word, word phrase or character upon being selected two times in succession.

113. A word output device, comprising:
a keyboard including,
a plurality of keys arranged in a first matrix, keys of the first matrix being similarly grammatically associated and associated with a common first color, the first common color indicating common number of selections necessary to access an associated word, word phrase or character, and
a plurality of keys arranged in a second matrix, keys of the second matrix being similarly grammatically associated and associated with a second color, different from the first color, the second common color indicating a second number of selections, different from the first number, necessary to access an associated word, word phrase or character;
a memory, adapted to store words, word phrases or characters in association with one or more of the plurality of keys;
a controller, adapted to access a stored word, word phrase or character in response to selection of one or more of the plurality of keys; and
an output unit, adapted to output the accessed word, word phrase or character.

114. The output device of claim 113, wherein the keyboard further includes:
a plurality of keys arranged in a third matrix, keys of the third matrix being associated with a third color, different from the first and second color, the third common color indicating a third common number of actuations necessary to access an associated word or character, the third common number of actuations being different from at least one of the first and second common number of actuations.

115. The output device of claim 114, wherein keys of the third color are associated with a character including at least one of a letter, a number and a bigram.

116. The output device of claim 113, wherein at least one of the matrices includes a plurality of sub-matrices.

117. The output device of claim 116, wherein keys of at least one sub-matrix are similarly grammatically associated.

118. The output device of claim 117, wherein keys of multiple sub-matrices are grammatically linked.

119. The word output device of claim 113, wherein the output device includes a speech synthesizer.

120. The word output device of claim 113, further comprising:
a row-column scanner, adapted to successively access keys of rows and column of the keyboard for selection.

121. The word output device of claim 120, wherein the memory is adapted to store a plurality of words, word phrases or characters, stored in association with at least one of a single key and a sequence of keys.

122. The word output device of claim 120, wherein, upon the selection of a first key, the controller essentially restricts the row-column scanner to access of keys that correspond to a stored next key in a stored key sequence in the memory.

123. The word output device of claim 121, wherein, upon the selection of a first key, the controller essentially restricts the row-column scanner to access of keys that correspond to a stored next key in a key sequence stored in the memory.

124. The word output device of claim 123, wherein the memory is further adapted to store a command for switching the device into a spelling mode, in association with a sequence of at least two keys corresponding to alphabetic characters.

125. The word output device if claim 120, wherein the memory is adapted to store a plurality of word phrases, stored in association with a sequence of at least two keys including one key of one matrix and at least one key of a different grammatically linked matrix.

126. The word output device of claim 125, wherein, upon the selection of a first key in a first matrix, the controller essentially restricts the row-column scanner to access of keys in at least one other different grammatically liked matrix.

127. The word output device of claim 120, wherein the row-column scanner is a quadrant row-column scanner, adapted to successively access quadrants of rows and columns of keys for selection.

128. The word output device of claim 127, wherein, upon selection of a first key, the controller essentially restricts the quadrant row-column scanner to access of keys that correspond to a stored next key in a key sequence stored in the memory.

129. The word output device of claim 127, wherein, upon the selection of a first key in a first matrix, the controller essentially restricts the quadrant row-column scanner to access of keys in at least one other different grammatically linked matrix.

130. The word output device of claim 120, wherein the memory is further adapted to store a command for switching the device into a spelling mode, in association with a sequence of at least two keys corresponding to alphabetic characters.

* * * * *